US011210276B1

(12) United States Patent
Smith

(10) Patent No.: US 11,210,276 B1
(45) Date of Patent: Dec. 28, 2021

(54) DATABASE SYSTEM FOR AUTOMATED EVENT ANALYSIS AND DETECTION

(71) Applicant: Experian Information Solutions, Inc., Costa Mesa, CA (US)

(72) Inventor: Brad Smith, Costa Mesa, CA (US)

(73) Assignee: EXPERIAN INFORMATION SOLUTIONS, INC., Costa Mesa, CA (US)

(*) Notice: Subject to any disclaimer, the term of this patent is extended or adjusted under 35 U.S.C. 154(b) by 174 days.

(21) Appl. No.: 16/035,427

(22) Filed: Jul. 13, 2018

Related U.S. Application Data

(60) Provisional application No. 62/532,929, filed on Jul. 14, 2017.

(51) Int. Cl.
*G06F 16/22* (2019.01)
*G06F 16/215* (2019.01)

(52) U.S. Cl.
CPC ............ *G06F 16/22* (2019.01); *G06F 16/215* (2019.01)

(58) Field of Classification Search
CPC .............................. G06F 16/22; G06F 16/215
See application file for complete search history.

(56) References Cited

U.S. PATENT DOCUMENTS

| 4,989,144 A | 1/1991 | Barnett, III |
| 5,120,704 A | 6/1992 | Lechter et al. |
| 5,201,010 A | 4/1993 | Deaton et al. |
| 5,216,612 A | 6/1993 | Cornett et al. |
| 5,488,360 A | 1/1996 | Ray |

(Continued)

FOREIGN PATENT DOCUMENTS

| EP | 0 749 081 | 12/1996 |
| EP | 1 122 664 | 8/2001 |

(Continued)

OTHER PUBLICATIONS

"Activant PartExpert with Vehicle Identification Number (VIN) Lookup", Activant Solutions, Inc., Livermore, CA, Copyright 2006, http://counterworks.com/PartExp_DS_092806.pdf, pp. 2.

(Continued)

*Primary Examiner* — Pierre M Vital
*Assistant Examiner* — Zuheir A Mheir
(74) *Attorney, Agent, or Firm* — Knobbe, Martens, Olson & Bear, LLP

(57) ABSTRACT

Embodiments of a data processing system comprises a first database including first records and a second database including second records. The data processing system may also comprise a processor configured to execute instructions to receive a first filter item comprising a first criterion and a second filter item comprising a second criterion and identify, in the first and second records, at least one record that meets the first criterion of the first filter item. The instructions may update the at least one record to include a unique identifier and generate a third database including third records by identifying, in the first and second records, records that include the unique identifier. The instructions may cause a comparison of a rubric of historical linkage features with the third records to identify an element of historical linkage between the at least one record and the third records and generate an event notification including the element of historical linkage.

20 Claims, 10 Drawing Sheets

(56) References Cited

U.S. PATENT DOCUMENTS

| | | | |
|---|---|---|---|
| 5,532,838 | A | 7/1996 | Barbari |
| 5,587,575 | A | 12/1996 | Leitner et al. |
| 5,630,070 | A | 5/1997 | Dietrich et al. |
| 5,748,098 | A | 5/1998 | Grace |
| 5,765,143 | A | 6/1998 | Sheldon et al. |
| 5,819,234 | A | 10/1998 | Slavin et al. |
| 5,878,403 | A | 3/1999 | DeFrancesco |
| 5,940,812 | A | 8/1999 | Tengel et al. |
| 5,950,169 | A | 9/1999 | Borghesi et al. |
| 5,963,129 | A | 10/1999 | Warner |
| 5,995,947 | A | 11/1999 | Fraser et al. |
| 6,006,201 | A | 12/1999 | Berent et al. |
| 6,038,554 | A | 3/2000 | Vig |
| 6,052,065 | A | 4/2000 | Glover |
| 6,052,068 | A | 4/2000 | Price R-W et al. |
| 6,076,064 | A | 6/2000 | Rose, Jr. |
| 6,126,332 | A | 10/2000 | Cubbage et al. |
| 6,154,152 | A | 11/2000 | Ito |
| 6,182,048 | B1 | 1/2001 | Osborn et al. |
| 6,208,979 | B1 | 3/2001 | Sinclair |
| 6,236,977 | B1 | 5/2001 | Verba et al. |
| 6,278,936 | B1 | 8/2001 | Jones |
| 6,282,517 | B1 | 8/2001 | Wolfe et al. |
| 6,330,499 | B1 | 12/2001 | Chou et al. |
| 6,330,546 | B1 * | 12/2001 | Gopinathan ............ G06Q 20/00 705/35 |
| 6,430,539 | B1 | 8/2002 | Lazarus et al. |
| 6,516,239 | B1 | 2/2003 | Madden et al. |
| 6,587,841 | B1 | 7/2003 | DeFrancesco |
| 6,609,108 | B1 | 8/2003 | Pulliam et al. |
| 6,714,859 | B2 | 3/2004 | Jones |
| 6,738,748 | B2 | 5/2004 | Wetzer |
| 6,754,564 | B2 | 6/2004 | Newport |
| 6,760,794 | B2 | 7/2004 | Deno et al. |
| 6,772,145 | B2 | 8/2004 | Shishido |
| 6,804,606 | B2 | 10/2004 | Jones |
| 6,839,682 | B1 | 1/2005 | Blume et al. |
| 6,904,359 | B2 | 6/2005 | Jones |
| 6,938,021 | B2 | 8/2005 | Shear et al. |
| 6,959,281 | B1 | 10/2005 | Freeling et al. |
| 6,980,963 | B1 | 12/2005 | Hanzek |
| 7,024,418 | B1 | 4/2006 | Childress |
| 7,050,982 | B2 | 5/2006 | Sheinson et al. |
| 7,069,118 | B2 | 6/2006 | Coletrane et al. |
| 7,092,898 | B1 | 8/2006 | Mattick et al. |
| 7,113,853 | B2 | 9/2006 | Hecklinger |
| 7,130,821 | B1 | 10/2006 | Connors et al. |
| 7,181,427 | B1 | 2/2007 | DeFrancesco |
| 7,184,974 | B2 | 2/2007 | Shishido |
| 7,191,058 | B2 | 3/2007 | Laird et al. |
| 7,228,298 | B1 | 6/2007 | Raines |
| 7,288,298 | B2 | 6/2007 | Raines |
| 7,275,083 | B1 | 9/2007 | Seibel et al. |
| 7,366,694 | B2 | 4/2008 | Lazerson |
| 7,392,203 | B2 | 6/2008 | Edison et al. |
| 7,392,221 | B2 | 6/2008 | Nabe et al. |
| 7,418,408 | B1 | 8/2008 | Heppe |
| 7,421,322 | B1 | 9/2008 | Silversmith et al. |
| 7,433,891 | B2 | 10/2008 | Haber et al. |
| 7,444,302 | B2 | 10/2008 | Hu et al. |
| 7,472,088 | B2 | 12/2008 | Taylor et al. |
| RE40,692 | E | 3/2009 | Rose, Jr. |
| 7,505,838 | B2 | 3/2009 | Raines et al. |
| 7,561,963 | B2 | 7/2009 | Brice et al. |
| 7,567,922 | B1 | 7/2009 | Weinberg et al. |
| 7,571,139 | B1 | 8/2009 | Giordano et al. |
| 7,580,856 | B1 | 8/2009 | Pliha |
| 7,590,589 | B2 | 9/2009 | Hoffberg |
| 7,593,893 | B1 | 9/2009 | Ladd et al. |
| 7,596,512 | B1 | 9/2009 | Raines et al. |
| 7,603,293 | B2 | 10/2009 | Chenn |
| 7,610,257 | B1 | 10/2009 | Abrahams |
| 7,630,932 | B2 | 12/2009 | Danaher et al. |
| 7,653,592 | B1 | 1/2010 | Flaxman et al. |
| 7,693,896 | B1 | 4/2010 | Raines |
| 7,739,142 | B2 | 6/2010 | Chand et al. |
| 7,778,841 | B1 | 8/2010 | Bayer et al. |
| 7,788,147 | B2 | 8/2010 | Haggerty et al. |
| 7,835,940 | B2 | 11/2010 | Kowalchuk |
| 7,865,409 | B1 | 1/2011 | Monaghan |
| 7,877,320 | B1 | 1/2011 | Downey |
| 7,925,654 | B1 | 4/2011 | Raines |
| 7,945,478 | B2 | 5/2011 | Hogan et al. |
| 7,945,483 | B2 | 5/2011 | Inghelbrecht et al. |
| 7,962,404 | B1 | 6/2011 | Metzger, II et al. |
| 7,966,210 | B2 | 6/2011 | Hall et al. |
| 7,974,886 | B2 | 7/2011 | Coleman |
| 7,991,689 | B1 | 8/2011 | Brunzell et al. |
| 8,005,759 | B2 | 8/2011 | Hirtenstein et al. |
| 8,005,795 | B2 | 8/2011 | Galipeau et al. |
| 8,036,952 | B2 | 10/2011 | Mohr et al. |
| 8,055,544 | B2 | 11/2011 | Ullman et al. |
| 8,078,524 | B2 | 12/2011 | Crawford et al. |
| 8,104,671 | B2 | 1/2012 | Besecker et al. |
| 8,121,938 | B1 | 2/2012 | Zettner et al. |
| 8,185,417 | B2 | 5/2012 | Brown et al. |
| 8,219,464 | B2 | 7/2012 | Inghelbrecht et al. |
| 8,239,388 | B2 | 8/2012 | Raines |
| 8,244,563 | B2 | 8/2012 | Coon et al. |
| 8,255,243 | B2 | 8/2012 | Raines et al. |
| 8,255,244 | B2 | 8/2012 | Raines et al. |
| 8,285,656 | B1 | 10/2012 | Chang et al. |
| 8,355,983 | B1 | 1/2013 | Parr et al. |
| 8,380,594 | B2 | 2/2013 | Berkman et al. |
| 8,392,334 | B2 | 3/2013 | Hirtenstein et al. |
| 8,438,048 | B1 | 5/2013 | Benavides, III |
| 8,438,170 | B2 | 5/2013 | Koran et al. |
| 8,521,615 | B2 | 8/2013 | Inghelbrecht et al. |
| 8,560,161 | B1 | 10/2013 | Kator et al. |
| 8,577,736 | B2 | 11/2013 | Swinson et al. |
| 8,595,079 | B1 | 11/2013 | Raines et al. |
| 8,600,783 | B2 | 12/2013 | Smith et al. |
| 8,600,823 | B1 | 12/2013 | Raines et al. |
| 8,606,648 | B2 | 12/2013 | Bayer et al. |
| 8,626,560 | B1 * | 1/2014 | Anderson .......... G06Q 30/0255 705/7.29 |
| 8,630,929 | B2 | 1/2014 | Haggerty et al. |
| 8,645,193 | B2 | 2/2014 | Swinson et al. |
| 8,661,032 | B2 | 2/2014 | Otten et al. |
| 8,725,584 | B1 | 5/2014 | Eager et al. |
| 8,781,846 | B2 | 7/2014 | Swinson et al. |
| 9,020,843 | B2 | 4/2015 | Taira et al. |
| 9,020,844 | B2 | 4/2015 | Taira et al. |
| 9,053,589 | B1 | 6/2015 | Kator et al. |
| 9,053,590 | B1 | 6/2015 | Kator et al. |
| 9,076,276 | B1 | 7/2015 | Kator et al. |
| 9,087,335 | B2 | 7/2015 | Rane et al. |
| 9,105,048 | B2 | 8/2015 | Koran et al. |
| 9,111,308 | B2 | 8/2015 | Taira et al. |
| 9,123,056 | B2 | 9/2015 | Singh et al. |
| 9,129,325 | B2 | 9/2015 | Taira et al. |
| 9,147,217 | B1 | 9/2015 | Zabritski et al. |
| 9,292,860 | B2 | 3/2016 | Singh et al. |
| 9,501,781 | B2 | 11/2016 | Singh et al. |
| 9,646,308 | B1 | 5/2017 | Eager et al. |
| 9,690,820 | B1 * | 6/2017 | Girulat, Jr. ............. G06Q 40/06 |
| 9,697,544 | B1 | 7/2017 | Bayer et al. |
| 9,727,904 | B2 | 8/2017 | Inghelbrecht et al. |
| 9,741,066 | B2 | 8/2017 | Eager et al. |
| 9,754,304 | B2 | 9/2017 | Taira et al. |
| 9,818,140 | B2 | 11/2017 | Inghelbrecht et al. |
| 9,904,933 | B2 | 2/2018 | Taira et al. |
| 9,904,948 | B2 | 2/2018 | Taira et al. |
| 10,162,848 | B2 | 12/2018 | Mohan et al. |
| 10,163,156 | B1 | 12/2018 | Shapley et al. |
| 10,217,123 | B2 | 2/2019 | Taira et al. |
| 10,269,030 | B2 | 4/2019 | Taira et al. |
| 10,269,031 | B2 | 4/2019 | Inghelbrecht et al. |
| 10,380,654 | B2 | 8/2019 | Hirtenstein et al. |
| 10,409,867 | B1 | 9/2019 | Von Busch et al. |
| 10,430,848 | B2 * | 10/2019 | Cotton ................. G06Q 40/025 |
| 10,489,809 | B2 | 11/2019 | Inghelbrecht et al. |
| 10,489,810 | B2 | 11/2019 | Taira et al. |
| 10,515,382 | B2 | 12/2019 | Taira et al. |

(56) References Cited

U.S. PATENT DOCUMENTS

| | | | |
|---|---|---|---|
| 10,565,181 B1 | 2/2020 | Hjermstad et al. |
| 10,580,054 B2 | 3/2020 | Cain et al. |
| 10,581,825 B2 | 3/2020 | Poschel et al. |
| 10,740,404 B1 | 8/2020 | Hjermstad et al. |
| 10,853,831 B2 | 12/2020 | Inghelbrecht et al. |
| 10,977,727 B1 | 4/2021 | Smith et al. |
| 2001/0044769 A1 | 11/2001 | Chaves |
| 2002/0023051 A1 | 2/2002 | Kunzle et al. |
| 2002/0042752 A1 | 4/2002 | Chaves |
| 2002/0072964 A1 | 6/2002 | Choi |
| 2002/0082978 A1 | 6/2002 | Ghouri et al. |
| 2002/0091706 A1 | 7/2002 | Anderson et al. |
| 2002/0099628 A1 | 7/2002 | Takaoka et al. |
| 2002/0103622 A1 | 8/2002 | Burge |
| 2002/0128960 A1 | 9/2002 | Lambiotte et al. |
| 2002/0161496 A1 | 10/2002 | Yamaki |
| 2002/0193925 A1 | 12/2002 | Funkhouser et al. |
| 2003/0033242 A1 | 2/2003 | Lynch et al. |
| 2003/0041019 A1 | 2/2003 | Vagim, III et al. |
| 2003/0046179 A1 | 3/2003 | Anabtawi et al. |
| 2003/0101111 A1 | 5/2003 | Dang et al. |
| 2003/0105728 A1 | 6/2003 | Yano et al. |
| 2003/0144950 A1 | 7/2003 | O'Brien et al. |
| 2003/0177481 A1 | 9/2003 | Amaru et al. |
| 2003/0187753 A1 | 10/2003 | Takaoka |
| 2003/0200151 A1 | 10/2003 | Ellenson et al. |
| 2003/0216965 A1 | 11/2003 | Libman |
| 2003/0233323 A1 | 12/2003 | Bilski et al. |
| 2004/0034657 A1 | 2/2004 | Zambo et al. |
| 2004/0039646 A1 | 2/2004 | Hacker |
| 2004/0088228 A1 | 5/2004 | Mercer et al. |
| 2004/0107125 A1 | 6/2004 | Guheen et al. |
| 2004/0128262 A1 | 7/2004 | Nafousi |
| 2004/0163101 A1 | 8/2004 | Swix |
| 2004/0193644 A1 | 9/2004 | Baker et al. |
| 2004/0243506 A1 | 12/2004 | Das |
| 2004/0249532 A1 | 12/2004 | Kelly et al. |
| 2005/0010555 A1 | 1/2005 | Gallivan |
| 2005/0021384 A1 | 1/2005 | Pantaleo et al. |
| 2005/0038580 A1 | 2/2005 | Seim et al. |
| 2005/0113991 A1 | 5/2005 | Rogers et al. |
| 2005/0173524 A1 | 8/2005 | Schrader |
| 2005/0177489 A1 | 8/2005 | Neff et al. |
| 2005/0209892 A1 | 9/2005 | Miller |
| 2005/0234912 A1 | 10/2005 | Roach |
| 2005/0246256 A1 | 11/2005 | Gastineau et al. |
| 2005/0251820 A1 | 11/2005 | Stefanik et al. |
| 2005/0256780 A1 | 11/2005 | Eldred |
| 2005/0267754 A1 | 12/2005 | Schultz et al. |
| 2005/0267774 A1 | 12/2005 | Merritt et al. |
| 2006/0004731 A1 | 1/2006 | Seibel et al. |
| 2006/0010052 A1 | 1/2006 | Willingham |
| 2006/0015425 A1 | 1/2006 | Brooks |
| 2006/0031182 A1 | 2/2006 | Ryan et al. |
| 2006/0041443 A1 | 2/2006 | Horvath |
| 2006/0107560 A1 | 5/2006 | Wong |
| 2006/0149674 A1* | 7/2006 | Cook .................... G06Q 40/02 705/44 |
| 2006/0163868 A1 | 7/2006 | Baumann |
| 2006/0178957 A1 | 8/2006 | LeClaire |
| 2006/0178973 A1 | 8/2006 | Chiovari et al. |
| 2006/0202012 A1 | 9/2006 | Grano et al. |
| 2006/0202862 A1 | 9/2006 | Ratnakar |
| 2006/0206416 A1 | 9/2006 | Farias |
| 2006/0218079 A1 | 9/2006 | Goldblatt et al. |
| 2006/0229799 A1 | 10/2006 | Nimmo et al. |
| 2006/0242046 A1 | 10/2006 | Haggerty et al. |
| 2006/0242050 A1 | 10/2006 | Haggerty et al. |
| 2006/0277141 A1 | 12/2006 | Palmer |
| 2007/0011083 A1 | 1/2007 | Bird et al. |
| 2007/0027791 A1 | 2/2007 | Young et al. |
| 2007/0043487 A1 | 2/2007 | Krzystofczyk et al. |
| 2007/0059442 A1 | 3/2007 | Sabeta |
| 2007/0136163 A1 | 6/2007 | Bell |
| 2007/0156515 A1 | 7/2007 | Hasselback et al. |
| 2007/0162293 A1 | 7/2007 | Malkon |
| 2007/0173993 A1 | 7/2007 | Nielsen et al. |
| 2007/0179798 A1 | 8/2007 | Inbarajan |
| 2007/0179860 A1 | 8/2007 | Romero |
| 2007/0185777 A1 | 8/2007 | Pyle et al. |
| 2007/0192165 A1 | 8/2007 | Haggerty et al. |
| 2007/0226131 A1 | 9/2007 | Decker et al. |
| 2007/0244732 A1 | 10/2007 | Chatterji et al. |
| 2007/0250327 A1 | 10/2007 | Hedy |
| 2007/0271178 A1 | 11/2007 | Davis et al. |
| 2007/0282713 A1 | 12/2007 | Ullman et al. |
| 2007/0288271 A1 | 12/2007 | Klinkhammer |
| 2007/0294163 A1 | 12/2007 | Harmon et al. |
| 2008/0015954 A1 | 1/2008 | Huber et al. |
| 2008/0016119 A1 | 1/2008 | Sharma et al. |
| 2008/0059317 A1 | 3/2008 | Chandran et al. |
| 2008/0071882 A1 | 3/2008 | Hering et al. |
| 2008/0097663 A1 | 4/2008 | Morimoto |
| 2008/0120155 A1 | 5/2008 | Pliha |
| 2008/0126137 A1 | 5/2008 | Kidd et al. |
| 2008/0177590 A1 | 7/2008 | Brodsky et al. |
| 2008/0183689 A1* | 7/2008 | Kubota .................... G06F 16/2471 |
| 2008/0183722 A1 | 7/2008 | Lane et al. |
| 2008/0201163 A1 | 8/2008 | Barker et al. |
| 2008/0228635 A1 | 9/2008 | Megdal et al. |
| 2008/0235061 A1 | 9/2008 | Innes |
| 2008/0255897 A1 | 10/2008 | Megdal et al. |
| 2008/0294540 A1 | 11/2008 | Celka et al. |
| 2008/0294546 A1 | 11/2008 | Flannery |
| 2008/0301188 A1 | 12/2008 | O'Hara |
| 2008/0312969 A1 | 12/2008 | Raines et al. |
| 2009/0018996 A1 | 1/2009 | Hunt et al. |
| 2009/0055044 A1 | 2/2009 | Dienst |
| 2009/0063172 A1 | 3/2009 | Thomas et al. |
| 2009/0083130 A1 | 3/2009 | Hall et al. |
| 2009/0138290 A1 | 5/2009 | Holden |
| 2009/0144201 A1 | 6/2009 | Gierkink et al. |
| 2009/0187513 A1 | 7/2009 | Noy et al. |
| 2009/0240602 A1 | 9/2009 | Mohr et al. |
| 2009/0240735 A1 | 9/2009 | Grandhi et al. |
| 2009/0271296 A1 | 10/2009 | Romero |
| 2009/0271385 A1* | 10/2009 | Krishnamoorthy ......................... G06F 16/24532 |
| 2009/0287370 A1 | 11/2009 | Iwai et al. |
| 2010/0030649 A1 | 2/2010 | Ubelhor |
| 2010/0049538 A1* | 2/2010 | Frazer .................... G06Q 30/02 705/14.4 |
| 2010/0070343 A1 | 3/2010 | Taira et al. |
| 2010/0070382 A1 | 3/2010 | Inghelbrecht et al. |
| 2010/0076881 A1 | 3/2010 | O'Grady et al. |
| 2010/0082792 A1 | 4/2010 | Johnson |
| 2010/0088158 A1 | 4/2010 | Pollack |
| 2010/0094664 A1* | 4/2010 | Bush .................... G06Q 40/08 705/4 |
| 2010/0153235 A1 | 6/2010 | Mohr et al. |
| 2010/0161486 A1 | 6/2010 | Liu et al. |
| 2010/0174657 A1 | 7/2010 | Stanton, Jr. |
| 2010/0179861 A1 | 7/2010 | Teerilahti et al. |
| 2010/0198629 A1 | 8/2010 | Weisleder et al. |
| 2010/0217616 A1 | 8/2010 | Colson et al. |
| 2010/0223106 A1 | 9/2010 | Hallowell et al. |
| 2010/0293089 A1 | 11/2010 | Peterson et al. |
| 2010/0293181 A1 | 11/2010 | Muller et al. |
| 2010/0299190 A1 | 11/2010 | Pratt et al. |
| 2010/0332292 A1 | 12/2010 | Anderson |
| 2011/0022489 A1 | 1/2011 | Hallowell et al. |
| 2011/0022525 A1 | 1/2011 | Swinson et al. |
| 2011/0040440 A1 | 2/2011 | de Oliveira et al. |
| 2011/0082759 A1 | 4/2011 | Swinson et al. |
| 2011/0137758 A1 | 6/2011 | Bienias |
| 2011/0161115 A1 | 6/2011 | Hampton |
| 2011/0202471 A1 | 8/2011 | Scott et al. |
| 2011/0213641 A1 | 9/2011 | Metzger, II et al. |
| 2011/0264595 A1 | 10/2011 | Anspach et al. |
| 2011/0270706 A1 | 11/2011 | Anspach et al. |
| 2011/0270707 A1 | 11/2011 | Breed et al. |
| 2011/0276467 A1 | 11/2011 | Blackburn et al. |
| 2011/0320241 A1 | 12/2011 | Miller |
| 2012/0005045 A1 | 1/2012 | Baker |

(56) References Cited

U.S. PATENT DOCUMENTS

| | | | |
|---|---|---|---|
| 2012/0005108 A1 | 1/2012 | Hollenshead et al. | |
| 2012/0106801 A1 | 5/2012 | Jackson | |
| 2012/0109770 A1 | 5/2012 | Seergy et al. | |
| 2012/0197699 A1 | 8/2012 | Snell et al. | |
| 2012/0221485 A1 | 8/2012 | Leidner et al. | |
| 2012/0239637 A9 | 9/2012 | Prakash et al. | |
| 2012/0254017 A1 | 10/2012 | Fusco et al. | |
| 2012/0265648 A1 | 10/2012 | Jerome et al. | |
| 2012/0271850 A1 | 10/2012 | Licata Messana et al. | |
| 2012/0331010 A1 | 12/2012 | Christie | |
| 2013/0006801 A1 | 1/2013 | Solari et al. | |
| 2013/0006809 A1 | 1/2013 | Hollenshead et al. | |
| 2013/0159033 A1 | 6/2013 | Weinstock et al. | |
| 2013/0173453 A1 | 7/2013 | Raines et al. | |
| 2013/0173481 A1* | 7/2013 | Hirtenstein | G06Q 30/0278 |
| | | | 705/306 |
| 2013/0238455 A1 | 9/2013 | Laracey | |
| 2013/0268298 A1 | 10/2013 | Elkins et al. | |
| 2014/0025681 A1 | 1/2014 | Raines | |
| 2014/0058956 A1 | 2/2014 | Raines et al. | |
| 2014/0082017 A1 | 3/2014 | Miller | |
| 2014/0258309 A1 | 9/2014 | Young | |
| 2014/0358719 A1 | 12/2014 | Inghelbrect et al. | |
| 2015/0154608 A9 | 6/2015 | Raines | |
| 2015/0213559 A1 | 7/2015 | Raines et al. | |
| 2015/0227942 A1 | 8/2015 | Sidman et al. | |
| 2015/0310865 A1* | 10/2015 | Fay | G10L 15/01 |
| | | | 704/254 |
| 2015/0324400 A1* | 11/2015 | Sheck | H04W 4/80 |
| | | | 707/795 |
| 2015/0332411 A1 | 11/2015 | Bush et al. | |
| 2015/0348143 A1 | 12/2015 | Raines et al. | |
| 2015/0348145 A1 | 12/2015 | Nakajima | |
| 2016/0004742 A1* | 1/2016 | Mohan | G06F 16/2365 |
| | | | 707/694 |
| 2016/0012494 A1 | 1/2016 | Lasini | |
| 2016/0180428 A1 | 6/2016 | Cain et al. | |
| 2016/0217046 A1 | 7/2016 | Lamoureux et al. | |
| 2016/0267588 A1 | 9/2016 | Cain et al. | |
| 2016/0299905 A1* | 10/2016 | Geyer | G06F 40/134 |
| 2016/0321726 A1 | 11/2016 | Singh et al. | |
| 2016/0379486 A1* | 12/2016 | Taylor | G08G 1/096844 |
| | | | 340/905 |
| 2017/0052652 A1 | 2/2017 | Denton et al. | |
| 2017/0270490 A1 | 9/2017 | Penilla et al. | |
| 2017/0323295 A1 | 11/2017 | Kranzley et al. | |
| 2018/0018723 A1 | 1/2018 | Nagla et al. | |
| 2018/0107676 A1 | 4/2018 | Vora | |
| 2018/0108189 A1 | 4/2018 | Park et al. | |
| 2018/0157761 A1* | 6/2018 | Halstead | G06F 16/9535 |
| 2018/0165747 A1 | 6/2018 | Patten et al. | |
| 2018/0349988 A1 | 12/2018 | Shebesta et al. | |
| 2019/0295133 A1 | 9/2019 | Hirtenstein et al. | |
| 2020/0051102 A1 | 2/2020 | Taira et al. | |
| 2020/0065885 A1 | 2/2020 | Smith | |
| 2020/0065898 A1 | 2/2020 | Forrester et al. | |
| 2020/0265480 A1 | 8/2020 | Swinson et al. | |

FOREIGN PATENT DOCUMENTS

| | | |
|---|---|---|
| JP | 09-251486 | 9/1997 |
| JP | 10-222559 | 8/1998 |
| JP | 10-261009 | 9/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| JP | 2007-299281 | 11/2007 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| KR | 10-2002-0068866 | 8/2002 |
| WO | WO 99/004350 | 1/1999 |
| WO | WO 99/022328 | 5/1999 |
| WO | WO 01/071458 | 9/2001 |
| WO | WO 01/075754 | 10/2001 |
| WO | WO 03/101123 | 12/2003 |
| WO | WO 2007/149941 | 12/2007 |
| WO | WO 2008/022289 | 2/2008 |
| WO | WO 2018/199992 | 11/2018 |

OTHER PUBLICATIONS

"AutoConnect Partners with Organic to Build World's Most Comprehensive Online Emporium of Pre-Owned Vehicles", PR Newswire, May 19, 1998, pp. 2.

"Auto Market Statistics$^{SM}$:Drive Response with Aggregated Motor Vehicle Information", Experian, Apr. 2007, http://www.experian.com/assets/marketing-services/product-sheets/auto-market-statistics.pdf, pp. 2.

"Appraisal Tool", VAuto Live Market View, Dec. 14, 2007, http://www.vauto.com/vAuto_solution/appraisal.asp, pp. 3.

Autobytel.com, http://web.archive.org/web/20040806010507//http://autobytel.com/, as archived Aug. 6, 2004, pp. 3.

Bala, Pradip Kumar, "Purchase-Driven Classification for Improved Forecasting in Spare Parts Inventory Replenishment," International Journal of Computer Applications, Nov. 2010, vol. 10, No. 9, pp. 40-45.

Bankrate.com, http://web.archive.org/web/20040809000026/www.bankrate.com/brm/default.asp, as archived Aug. 9, 2004, pp. 3.

"Carfax Teams with Esurance", PR Newswire, May 14, 2001, p. 1.

Cars.com, http://web.archive.org/web/20041010081241/www.cars.com/go/index.jsp?aff=national, as archived Oct. 10, 2004, pp. 2.

Carsdirect.com, http://web.archive.org/web/20040730142836/www.carsdirect.com/home, as archived Jul. 30, 2004, pp. 2.

Checkbook.org, http://web.archive.org/web/20040604192834/www.checkbook.org/auto/carbarg.cfm, as archived Jun. 4, 2004, p. 1.

"Consumer Reports Finds American-Made Vehicles Close Reliability Gap with European-Made Vehicle—As Japanese Continue to Set New Benchmarks for the Industry", Consumer Reports: Consumers Union, Yonkers, NY, Apr. 2003, pp. 2.

Cohen et al., "Optimizer: IBM's Multi Echelon Inventory System for Managing Service Logistics", Interfaces, vol. 20, No. 1, Jan.-Feb. 1990, pp. 65-82.

"Driveitaway.com Links with AutoCheck to Provide Car Shoppers Vehicle Histories; Consumers Bidding on Driveitaway.com's Used Auto Auctions Can Now Go Online to Research a Specific Vehicle's History", PR Newswire, Jan. 15, 2001, p. 1.

"Experian Uses SSA-NAME3 to Match 40 to 50 Million Transactions per Month Against an 11.5 Billion Row Database", DM Review, Apr. 2001, vol. 11, No. 4, pp. 3.

Farrell et al., "Installed Base and Compatibility: Innovation, Product Preannouncements, and Predation", The American Economic Review, Dec. 1986, vol. 76, No. 5, pp. 940-955.

Garcia-Molina et al., "Database Systems: The Complete Book", Prentice Hall, Inc., Ch. 15, 2002, pp. 713-715.

Grange, Frank, "Challenges in Modeling Demand for Inventory Optimization of Slow-Moving Items," Proceedings of the 1998 Winter Simulation Conference, 1998, pp. 1211-1217.

Haffar, Imad, "'SPAM': A Computer Model for Management of Spare-Parts Inventories in Agricultural Machinery Dealerships", Computers and Electronics in Agriculture, vol. 12, Issue 4, Jun. 1995, pp. 323-332.

Handfield et al., "Managing Component Life Cycles in Dynamic Technological Environments", International Journal of Purchasing and Materials Management, Tempe, Spring 1994, vol. 30, No. 2, pp. 20-28.

Inderfurth et al., "Decision Support for Spare Parts Acquisition in Post Product Life Cycle", Central European Journal of Operations Research, 2008, vol. 16, pp. 17-42.

(56) References Cited

OTHER PUBLICATIONS

"Intelligence Insight Impact", Polk Automotive Manufacturers; http://usa.polk.com/Industries/AutoMfr/Analyze/MarketAnalysis/, Dec. 13, 2007, pp. 3.
International Search Report and Written Opinion in PCT Application No. PCT/US07/76152, dated Mar. 20, 2009.
Invoicedealers.com, http://web.archive.org/web/20040804044511/http://www.invoicedealers.com/, Aug. 4, 2004, pp. 2.
Ivillage.com, http://web.archive.org/web/20040729234947/http://www.ivillage.com/, Jul. 29, 2004, pp. 2.
"Japan's JAAI System Appraises Used Cars Over Internet", Asia Pulse, Mar. 3, 2000, p. 1.
Jaro, Matthew A., "Probabilistic Linkage of Large Public Health Data Files", Statistics in Medicine, 1995, vol. 14, pp. 491-498.
Käki, Anssi, "Forecasting in End-of-Life Spare Parts Procurement", Master's Thesis, Helsinki University of Technology, System Analysis Laboratory, Jul. 27, 2007, pp. 84.
Kennedy et al., "An Overview of Recent Literature on Spare Parts Inventories", International Journal of Production Economics, 2002, vol. 76, pp. 201-215.
Kim et al., "Optimal Pricing, EOL (End of Life) Warranty, and Spare Parts Manufacturing Strategy Amid Product Transition", European Journal of Operation Research, 2008, vol. 188, pp. 723-745.
Koller, Mike, "Wireless Service Aids," Internetweek, Jul. 9, 2001, p. 15.
Krupp, James A.G., "Forecasting for the Automotive Aftermarket", The Journal of Business Forecasting Methods & Systems, Winter 1993-1994, vol. 12, No. 4, ABI/Inform Global, pp. 8-12.
Lapide, Larry, "New Developments in Business Forecasting", The Journal of Business Forecasting, Spring 2002, pp. 12-14.
Lee, Ho Geun, "AUCNET: Electronic Intermediary for Used-Car Transactions", EM-Electronic Markets, Dec. 1997, vol. 7, No. 4, pp. 24-28.
Miller, Joe, "NADA Used-Car Prices Go Online", Automotive News, Jun. 14, 1999, p. 36.
Moore, John R., Jr. "Forecasting and Scheduling for Past-Model Replacement Parts", Management Science, Application Series, vol. 18, No. 4, Part 1, Dec. 1971, pp. B-200-B-213.
"NAAA-Recommended Vehicle Condition Gradin Scale", Noted as early as 2007, pp. 3.
Packer, A. H., "Simulation and Adaptive Forecasting an Applied to Inventory Control", Operations Research, Jul. 1965, vol. 15, No. 4, pp. 660-679.
"Power Information Network: Power to Drive your Business", J.D. Power and Associates Power Information Network, http://www.powerinfonet.com/products/productDetail.asp?type=financialinstitutions, Dec. 13, 2007, pp. 2.
Peters, Peter-Paul, "A Spare Parts Configurator for the European Service Business" (Graduation Report), Honeywell, Industrial Service Logistic Center, Amsterdam, The Netherlands, Mar. 2000, pp. 80.
Porter, G. Zell, "An Economic Method for Evaluating Electronic Component Obsolescence Solutions", www.gidep.org/data/dmsms/library/zell.pdf, May 1998, pp. 1-9.
"Pricing Tool", vAuto Live Market View, http://www.avauto.com/vAuto_Solution/pricing.asp, Dec. 13, 2007, pp. 2.
Reinbach, Andrew, "MCIF Aids Banks in CRA Compliance", Bank Systems & Technology, Aug. 1995, vol. 32, No. 8, p. 27.
Roos, Gina, "Web-Based Service Helps OEMs Cure Parts Obsolescence Blues", Electronic Engineering Times, Oct. 8, 2001, p. 86.
Santarini, Michael, "Forecasts the Probable Obsolescence of Components—Module Predicts Parts Life", Electronic Engineering Times, Jan. 11, 1999, vol. 1, p. 48.
Sawyers, Arlena, "NADA to Offer Residual Guide", Automotive News, May 22, 2000, p. 1.
Shapiro et al., "Systems Competition and Aftermarkets: an Economic Analysis of Kodak", The Antitrust Bulletin, Spring 1994, pp. 135-162.
"Stoneage Corporation Announces Database of 250,000 Used Cars Posted to the Internet", PR Newswire, Feb. 24, 1998, p. 1.
Sullivan, Laurie, "Obsolete-Parts Program Thriving", EBN, Manhasset, NY, Jan. 21, 2002, Issue 1296, p. 26.
"Urban Science Launches Second Generation Lead Scoring Solution", Urban Science, Detroit, MI, Mar. 1, 2007, http://www.urbanscience.com/newsevents/pr_2007022.html, pp. 3.
"WashingtonPost.com and Cars.com Launch Comprehensive Automotive Web Site for the Washington Area", PR Newswire, Oct. 22, 1998. pp. 2.
Watts, Craig, "Consumers Now Can Know What Loan Rate Offers to Expect Based on Their FICO Credit Score at MyFICO.com," San Rafael, CA, Mar. 6, 2002, pp. 2, http://www.myfico.com/PressRoom/PressReleases/2002_03_06.aspx.
Webster, Lee R., "Failure Rates & Life-Cycle Costs", Consulting-Specifying Engineer, Apr. 1998, vol. 23, No. 4, ABI/INFORM Global, p. 42.
"Web Sites Let Automotive Consumers Arm Themselves with Price Information", Orange County Register, Nov. 14, 1997, pp. 3.
"Yahoo! Autos Provides Enhanced Road Map for Researching, Buying and Selling Cars Online", PR Newswire, Oct. 13, 1998, pp. 2.
Copeland et al., "Wallet-on-Wheels—Using Vehicle's Identity for Secure Mobile Money", 17th International Conference on Intelligence in Next Generation Networks, 2013, pp. 102-109.
Greenlight.com Teams up With Credit Online to Expand Online Financing Options, Published in PR Newswire Association LLC; New York; Aug. 28, 2000 extracted from Dialog on Jun. 14, 2021, pp. 3.

* cited by examiner

DATABASE SYSTEM FOR AUTOMATED EVENT ANALYSIS AND DETECTION

CROSS-REFERENCE TO RELATED APPLICATIONS

This application claims the benefit of priority to U.S. Patent Application No. 62/532,929, filed Jul. 14, 2017, entitled METHOD AND SYSTEM FOR DETERMINING VEHICLE PURCHASE OR LEASE LOYALTY, which is hereby incorporated by reference herein in its entirety.

TECHNICAL FIELD

Embodiments of the present disclosure relate to data processing, including database and file management, as well as a database system for accessing one or more databases or other data structures.

BACKGROUND OF THE DISCLOSURE

Electronic databases provide for storage and retrieval of digital data records. Data records in such databases may be electronically updated.

SUMMARY OF THE DISCLOSURE

The systems, methods, and devices described herein each have several aspects, no single one of which is solely responsible for its desirable attributes. Without limiting the scope of this disclosure, several non-limiting features will now be described briefly.

Embodiments of the present disclosure relate to a database system (also herein referred to as "the system") for merging and aggregating data from discrete sources, automatically detecting trigger events, and conducting automated event analyses based on the aggregated data.

In one embodiment, a data processing system for accessing databases and data items is disclosed. The data processing system comprises a first database including a first plurality of records and a second database including a second plurality of records. The data processing system also comprises a hardware processor configured to execute computer-executable instructions in order to receive a first filter item comprising a first criterion and a second filter item comprising a second criterion and identify, in the first plurality of records and second plurality of records, at least one record that meets the first criterion of the first filter item. The hardware processor is also configured to execute computer-executable instructions in order to update the at least one record to include a unique identifier and generate a third database including a third plurality of records by identifying, in the first plurality of records and the second plurality of records, records that include the unique identifier. The hardware processor is further configured to execute computer-executable instructions in order to cause a first comparison of a rubric of historical linkage features with the third plurality of records to identify an element of historical linkage between the at least one record and the third plurality of records and generate an event notification including the element of historical linkage between the at least one record and the third plurality of records.

In another embodiment, a computer implemented method of accessing databases and data items is disclosed. The method comprises receiving a first filter item comprising a first criterion and a second filter item comprising a second criterion. The method further comprises accessing a first database including a first plurality of records and accessing a second database including a second plurality of records. The method also comprises identifying, in the first plurality of records and the second plurality of records, at least one record that meets the first criterion of the first filter item and updating the at least one record to include a unique identifier. The method also further comprises generating a third database including a third plurality of records by identifying, in the first plurality of records and the second plurality of records, records that include the unique identifier and causing a first comparison of a rubric of loyalty features with the at least one record and the third plurality of records to identify an element of historical linkage between the at least one record and the third plurality of records. The method further also comprises generating an event notification including the element of historical linkage between the at least one record and the third plurality of records.

In an additional embodiment, non-transitory, computer-readable storage media storing computer-executable instructions that, when executed by a computer system, configure the computer system to perform operations is disclosed. The operations comprise receiving a first filter item comprising a first criterion and a second filter item comprising a second criterion. The operations also comprise accessing a first database including a first plurality of records and accessing a second database including a second plurality of records. The operations further comprise identifying, in the first plurality of records and the second plurality of records, at least one record that meets the first criterion of the first filter item and updating the at least one record to include a unique identifier. The operations further also comprise generating a third database including a third plurality of records by identifying, in the first plurality of records and the second plurality of records, records that include the unique identifier and causing a first comparison of a rubric of loyalty features with the at least one record and the third plurality of records to identify an element of historical linkage between the at least one record and the third plurality of records. The operations also further comprise generating an event notification including the element of historical linkage between the at least one record and the third plurality of records.

In various embodiments, computer systems are disclosed that comprise one or more hardware computer processors in communication with one or more non-transitory computer readable storage devices, wherein the one or more hardware computer processors are configured to execute the plurality of computer executable instructions in order to cause the computer system to perform operations comprising one or more aspects of the above-described embodiments. In some embodiments, computer-implemented methods are disclosed in which, under control of one or more hardware computing devices configured with specific computer executable instructions, one or more aspects of the above-described embodiments are implemented and/or performed. In various embodiments, computer readable storage mediums storing software instructions are disclosed, wherein, in response to execution by a computing system having one or more hardware processors, the software instructions configure the computing system to perform operations comprising one or more aspects of the above-described embodiments.

BRIEF DESCRIPTION OF THE DRAWINGS

The above-mentioned aspects, as well as other features, aspects, and advantages of the present technology will now be described in connection with various aspects, with reference to the accompanying drawings. The illustrated aspects, however, are merely examples and are not intended to be limiting. Throughout the drawings, similar symbols typically identify similar components, unless context dictates otherwise. The following drawings and the associated descriptions are provided to illustrate embodiments of the present disclosure and do not limit the scope of the disclosure. Moreover, the relative dimensions of the following figures may not be drawn to scale.

The figures depicted herein and the corresponding descriptions may utilize examples involving dealers, vehicles, and corresponding entities and items. However, these entities and items may be replaced with any other entity accessing a computer device and/or analyzing events related to a tangible or virtual item.

DETAILED DESCRIPTION OF EMBODIMENTS

Figure 1A:
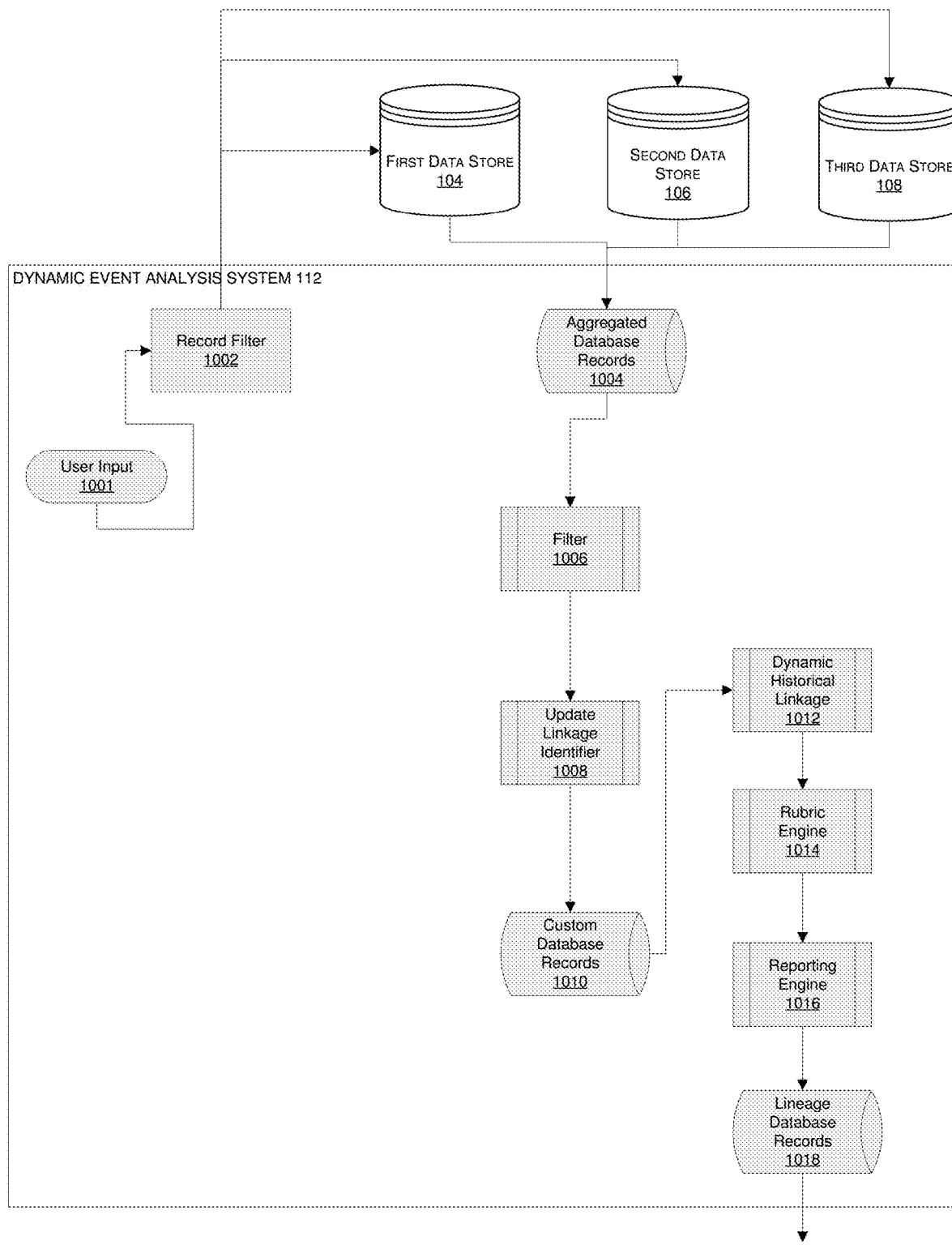
FIG. 1A is a data flow diagram of a database system for providing a dynamic event analysis system that analyzes database records, according to an embodiment.

Although certain embodiments and examples are disclosed below, subject matter extends beyond the specifically disclosed embodiments to other alternative embodiments and/or uses and to modifications and equivalents thereof. Thus, the scope of the application is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

Embodiments of the present disclosure relate to a database system (also herein referred to as "the system") for integrating data from remote, disparate database systems, identifying events, and dynamically filtering and applying rubrics and rules to generate customized databases and records that lead to the generation of unique electronic notifications (also referred to herein as "notifications", "reports", or "alerts") to third party systems based on dynamically received requirements. Subsets of the data from the disparate database systems may be requested, processed, and merged. The system may also generate linkage data and automatically append such linkage data onto a subset of the data and apply filters to match the dynamically received requirements and criteria. In addition, the system may automatically crawl, parse, or search the database to tag related records tied to one or more identified events and generate rankings on the tagged data. The system may also dynamically apply rules to generate customized data sets without over-utilizing too much processing power or memory storage, which may occur when datasets are used at too granular a level. The aggregation of the merged subsets of data may also assist with improving accuracy levels which can also decline when datasets are used at too granular a level. The system may generate encrypted data packets based on the customized data sets which provide instructions for rendering secure interfaces and data feeds based on the customized data.

Embodiments of the present disclosure also allow the system to conduct such integrating, filtering, rules application, or generation of records and databases in a time efficient manner as the data from one or more of the disparate database systems may be changing and/or the dynamically received requirements may be different for each request.

The dynamically generated, customized data sets may rely, at least in part, on data feeds from a plurality of databases, where one or more databases of the plurality of databases include different data and/or data in a different formats that may not be simply combined with data from one or more other databases. The dynamically generated, filters or customized models may utilize various rules for accessing, acquiring, processing, and generating outputs based on the plurality of databases. Accessing, acquiring, and processing the data may comprise, for example, aggregating, filtering, merging, comparing, and/or refining the data in the databases as well as the automatic generation of new data files and/or databases. Based on the information in the databases, other databases may be searched for records and the records from the other databases may be compared and/or combined with the information in the internal databases. By comparing records from the other databases, information that is only available in one of the databases may be identified and associated with information from other databases.

Embodiments of the present disclosure address the highly technical problem of integrating multiple, large disparate data sets which are constantly being updated as well as the problem of applying rules to records among the different data sets to identify information of high value without overconsuming too many processing or memory resources and while still maintaining a level of high accuracy. In addition, embodiments of the present disclosure address the highly technical problem of identifying and extracting requisite information from non-analogous records.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

II. Example Operation of the Dynamic Event System

Figure 1B:
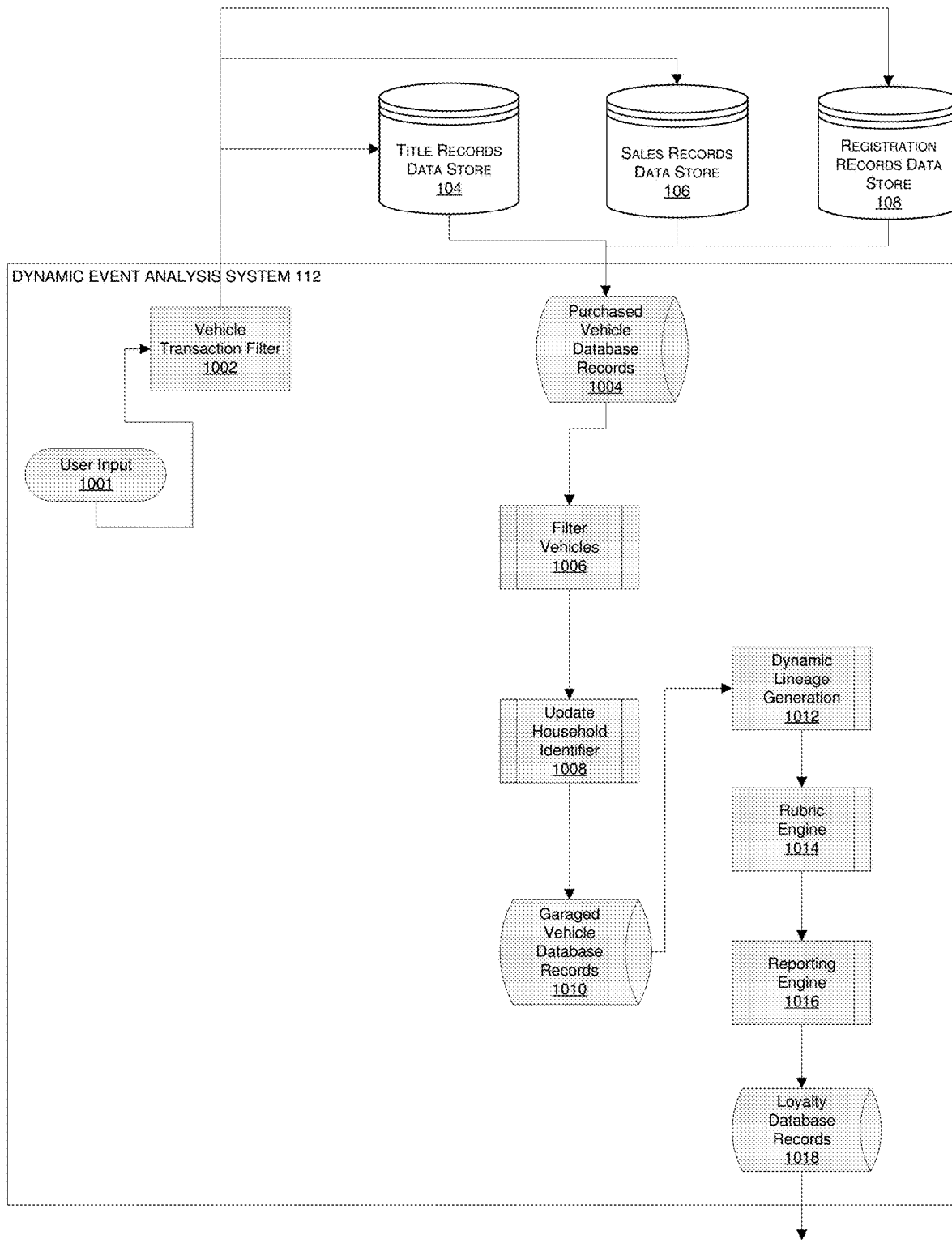
FIG. 1B is a data flow diagram of a database system for providing a dynamic event analysis system using an example use case as applied to vehicle data, according to an embodiment.

FIG. 1A provides an embodiment of a data flow process for a dynamic event analysis system 112. At 1001, a dynamic event analysis system 112 receives an electronic data packet storing instructions representing user input, which may include a request for generating a customized data set from an aggregated data store comprised of processed data feeds from several disparate data sets to generate one or more encrypted data packets based on the customized data set which provides instructions for rendering secure interfaces and data feeds based on the customized data. In some embodiments, the user input received at block 1001 may be automatically generated based on a trigger event and transmitted to the dynamic event analysis system and may comprise a request for a customized data set related to the trigger event and may include filter criteria to be applied to the customized data set. For example, using an example use case for determining historical vehicle loyalty, which is illustrated in FIG. 1B, the dynamic event analysis system 112 may include receiving a request for generating a report or notification regarding consumer loyalty based on a trigger event related to a recent vehicle acquisition and existing or previous vehicle associations. In some embodiments, the user input received at block 1001 may be an indicator of a vehicle acquisition and may comprise a request for generation of corresponding consumer loyalty records or information associated with the consumer involved in the vehicle acquisition.

At block 1002, the dynamic event analysis system 112 accesses one or more records filters to selectively filter information requested from one or more of first, second, third, and fourth data stores (for example, data stores 104, 106, 108, 114) and may sometimes use filter criteria included with the request. In some embodiments, the record filter may identify particular data items to be reviewed and obtained for use to identify flagged events. Further examples of corresponding filter data items are described below. The dynamic event analysis system 112 may implement the record filter on records in one or more of the first, second, third, and fourth data stores 104, 106, 108, 114 or a locally stored set of data compiled based on one or more of the first, second, third, and fourth data stores 104, 106, 108, 114. For example, the system 112 may query the first, second, third, and fourth data stores 104, 106, 108, 114 for specific sets of data based on the received user request and accompanying filter criteria. Using the example use case shown in FIG. 1B, the record filter may identify particular historical vehicle transactions that are reviewed and obtained for use in identifying consumer loyalty in vehicle acquisitions. For example, such record filter data may include identification of one or more of a used vehicle transaction, a new vehicle transaction, or a CPO transaction, for example by vehicle identification number ("VIN") of the vehicle. As another example, the record filter data may include a specific make, model, or class of vehicle, and/or a geographic region. Further, each of the first, second, third, and fourth data stores 104, 106, 108, 114 respectively, may include vehicle information regarding one or more features associated with a vehicle transaction (for example, a vehicle sale, lease, and so forth).

At 1004, the dynamic event analysis system 112 may create or otherwise access records from an aggregated data set. In some embodiments, the aggregated data set may include an aggregate of records selected from one or more of the first, second, third data third and fourth data stores 104, 106, 108, 114, respectively, and linked and aggregated by the dynamic event analysis system 112. In some embodiments, only records from one or two of these data stores may be aggregated. In some embodiments, the system 112 aggregates the records based on information from the user request of block 1001, but in other embodiments, the system 112 aggregates the records based on system 112 criteria and does not take into account user requests. In some embodiments, the system 112 aggregates the records into a new database. In some embodiments, aggregating the records into the new database may comprise generating new record structures including the structures of more than one of the first, second, third, and fourth data stores 104, 106, 108, 114. Using the example use case shown in FIG. 1B, the dynamic event analysis system 112 may create or otherwise access records from an acquired vehicle database, and the system 112 aggregates the records into a new database of acquired vehicle records. In some embodiments, this data is aggregated under a separate schedule (for example, daily, weekly, monthly, bi-monthly, every 6 months, when there is a threshold of new data available, and so forth) to have the aggregated database ready for when a request is received and is not aggregated in response to a request. Under the same example use case, if the first data store 104 stores information from a state department of motor vehicles ("DMV"), then the first data store 104 may provide a large number of records, as the state DMV may receive records of all vehicle transactions involving vehicles registered in the state. On the other hand, if the second data store 106 stores information from a particular dealer or manufacturer, then the second data store 106 may provide a smaller number of records as compared to the first data store 104. The dynamic event analysis system may access records stored in these third party systems and the link and aggregate the data for storage in a local database. The local database may then have information on a vehicle that includes title, sales data, and registration data.

At 1006, the dynamic event analysis system 112 may filter the record(s) in the aggregated data set. In some embodiments, filtering the vehicle record(s) includes automatically reviewing the data records to identify and tag selected records. In some embodiments, the records of interest may be identified at least in part by the user input received at 1001, such as filter criteria. In some embodiments, the user input may identify multiple record(s) or multiple categories of records of interest. Using the example use case shown in FIG. 1B, the aggregated data set may be a purchased vehicle records database that stores vehicle record where the system filters the vehicle record(s) in the purchased vehicle records database, which includes selecting a purchased vehicle record of interest from the purchased vehicle records database. In some embodiments, the purchased vehicle record of interest may be identified at least in part by the user input received at 1001, which may include the VIN (or other identifying information) of the purchased vehicle record of interest, and the user input may identify the purchased vehicle record(s) of interest with an associated party's name (for example the purchaser's name). As another example, the request may be for all BMW SUV sales in the last 6 months in the state of New Mexico such that the filter only retrieves categories related to the request from the purchased vehicle records database. As an additional example, the request may be for the recent sale of a new Honda Civic to John Doe at the Smith Dealership in Ashland, Oreg.

At 1008, the dynamic event analysis system 112 may update the tagged or selected records to include a group linkage or unique identifier. In some embodiments, multiple records in the data stores 104, 106, 108, 114, respectively, are associated with or include the same group linkage identifier. By associating the selected record(s) with the group linkage identifier, the selected record(s) is associated with other records from the data stores 104, 106, 108, 114. Using the example use case shown in FIG. 1B, the tagged records may include selected purchased vehicle records and the group linkage identifier may include a household identifier. Accordingly, the purchased vehicle will be associated with a particular household according to the household identifier. In some embodiments, multiple purchased vehicle records are associated with the same household identifier. By associating the selected purchased vehicle record with the household identifier, the selected purchased vehicle record is associated with other vehicle records. In some embodiments, the household identifier may comprise a name (for example, a last name), an address, or other identifying information that identifies all vehicle records associated with a particular owner or a particular address or family. In some embodiments, the identified vehicle records may be for currently owned or registered vehicles and/or previously owned or registered vehicles.

At 1010, the dynamic event analysis system 112 identifies other records from the data stores 104, 106, 108, 114 that share the group linkage identifier with the tagged or selected record. For example, when the selected record has the group linkage identifier of a particular value, the system 112 may request all records from the data stores 104, 106, 108, 114 that have the group linkage identifier matching that particular value. Such identification may result in the generation of a new custom database of records that includes all records that may be linked together using the group linkage identifier. Thus, 1010 results in the generation of the new custom database which includes all records currently or previously associated with the group linkage identifier. Using the example use case shown in FIG. 1B, the dynamic event analysis system 112 identifies other vehicle records that share the household identifier with the selected purchased vehicle record. For example, when the selected purchased vehicle record has the household identifier of a particular value, the system 112 may request all vehicle records for previously owned record(s) that have the household identifier matching that particular value. Such identification may result in the generation of a database of garaged vehicles that includes all vehicles that may be garaged together (for example, all vehicles registered at a particular address or registered to a particular individual or family (such as via a last name and address). The garaged vehicles database may include all vehicles currently in or associated with the garage of the consumer that acquired the "new" vehicle identified in the selected purchased vehicle record. Additional details of the garaged vehicles database may be provided herein.

At 1012, the dynamic event analysis system 112 applies a lineage history identifier to the record identified. The lineage history identifier may include a history of associations third party records associated with the selected record to represent a specific lineage. The lineage history identifier may provide information that ensures proper calculation of metrics and rubrics. In some embodiments, the lineage history identifier may include a mapping of historical third party records to new codes or old codes to new codes. By applying the lineage history identifier, one or more of the selected records and the historical record(s) may be updated to include multiple lineage codes. Using the example use case shown in FIG. 1B, the dynamic event analysis system 112 applies a dealer lineage to the vehicle identified in the selected purchased vehicle record. The dealer lineage may include a history of associations or codes of the dealer associated with the selected purchased vehicle. For example, a particular dealer may move locations or change its dealer code or even change associations with particular manufacturers or makes. The dealer lineage may provide information that ensures proper calculation of dealer/manufacturer/make loyalty results by ensuring that a vehicle is properly associated with a particular dealer, make, manufacturer, model, features, and so forth. In some embodiments, the dealer lineage may include a mapping of old dealer codes to new dealer codes or old model codes to new model codes. By applying the dealer lineage, one or more of the selected purchase record and the previously owned record(s) in the garaged vehicles database may be updated to include multiple dealer codes in, for example, a "dealer code", or similar, field such that the data indicates not only the garaged vehicles for the household, but also information on the dealerships from which those vehicles were purchased.

At 1014, the dynamic event analysis system 112 applies one or more rules to the one or more selected records and the historical record(s). These rules may be used to identify associations between the selected record(s) and the historical record(s). Further detail and examples regarding sample rules that the system 112 may apply are provided herein. Using the example use case shown in FIG. 1B, the dynamic event analysis system 112 applies one or more loyalty rules to the one or more selected purchase records and the previously owned record(s). These loyalty rules may be used to identify associations between the selected purchase record(s) and the previously owned record(s) that may identify loyalty maintained. For example, the loyalty rules may identify similarities (and thus, presumed or identified loyalty) in manufacturer, make, model, vehicle type, vehicle class, and so forth between the selected purchase record(s) from a recent vehicle acquisition and existing vehicle records of vehicles in the same garage as the vehicle(s) in the selected purchase record(s). However, it is recognized that a wide variety of rules may be used. Further detail regarding example rules that the system 112 may apply is provided herein.

At 1016, the dynamic event analysis system 112 generates a report, an encrypted data packet, an electronic notification, or other reporting data set storing data regarding one or more similarities identified by the rules applied by the system 112. Using the example use case shown in FIG. 1B, the system 112 may identify loyalty by the consumer of the selected purchase record(s) to a particular manufacturer (for example, General Motors), where the selected purchase record is for a Buick vehicle and the application of the loyalty rules identifies a Chevrolet vehicle and Pontiac vehicle registered at the same address and/or with the same last name as the selected purchase record in existing vehicle records in the data stores 104, 106, 108, 114. The reporting data set may include details regarding the identified loyalty or similarities.

At 1018, the dynamic event analysis system 112 generates a historical linkage database or dataset of the identified lineage or similarities. This historical linkage database or dataset may be generated to be provided to the user that provided the user input at 1001 or otherwise output to or made available to one or more entities. Using the example use case shown in FIG. 1B, the historical linkage database may be a loyalty database which includes the corresponding vehicle, household, and dealership data associated the requested consumer or consumers based on the selected purchase record(s), which are then stored in the loyalty database. In some embodiments, demographics may be appended and stored in the loyalty database as well. In some embodiments, a loyalty score may be generated based on where the loyalty or similarity is identified between the selected purchase record and the existing vehicle record. For example, loyalty between a manufacturer of vehicles identified in the records (for example, General Motors) may have a lower score as compared to loyalty identified between a particular dealership or salesperson. Furthermore, loyalty between multiple aspects (for example, manufacturer and dealership) may have a higher score than loyalty between just one of those same aspects of the records. In some embodiments, the loyalty database may include the loyalty score.

In some embodiments, the system 112 may generate the historical linkage database and/or a corresponding output file in response to a request or on a periodic basis (for example daily, weekly, monthly, bimonthly, quarterly, semi-annually, and so forth) and send a notification alert or notification package based on the period generation. The generated notification package or alert may comprise a digital and/or electronic message. Using the example use case shown in FIG. 1B, the notification package may include an indication of the corresponding records from the garaged vehicle database 1010 and/or the loyalty database 1018 along with any other data items from the corresponding record. In other embodiments, the notification package may be an indication to the user that provided the user input that the user should access the dynamic event analysis system 112 to review the records from the garaged vehicle database 1010 and/or the loyalty database 1018.

The notification may be sent to the user that provided the user input, and/or to any other recipient indicated by the user or the notification package. Further, the notification package may be delivered by any appropriate mode. Using the example use case shown in FIG. 1B, the dynamic event analysis system 112 may send a notification package that comprises information on households or consumers that showed loyalty in vehicle acquisitions as well as a score that indicated the relative loyalty. In some embodiments, the notification package may indicate the consumers or records that are located within particular geographic areas. The notification package may include one or more of the following fields for each consumer or record: name, address, city, state, zip code+4, loyalty score, and/or identified loyalty aspects.

In some embodiments, the alert and/or notification is automatically transmitted to a device operated by the user associated with corresponding notification. The alert and/or notification can be transmitted at the time that the alert and/or notification is generated or at some determined time after generation of the alert and/or notification. When received by the device, the alert and/or notification can cause the device to display the alert and/or notification via the activation of an application on the device (for example, a browser, a mobile application, and so forth). For example, receipt of the alert and/or notification may automatically activate an application on the device, such as a messaging application (for example, SMS or MMS messaging application), a standalone application (for example, a vehicle dealership application or vehicle financing application used by a financial agency), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page generated by the system so that the user can log in to the system and view the alert and/or notification. Alternatively, the alert and/or notification may include a URL of a webpage (or other online information) associated with the alert and/or notification, such that when the device (for example, a mobile device) receives the alert, a browser (or other application) is automatically activated and the URL included in the alert and/or notification is accessed via the Internet.

In some implementations, the alert and/or notification may be automatically routed directly to an interactive user interface where it may be viewed and/or evaluated by a user. In another example, the alert and/or notification may be automatically routed directly to a printer device where it may be printed in a report for review by a user. In another example, the alert and/or notification may be automatically routed directly to an electronic work queue device such that information from the notification may automatically be displayed to a user, and optionally information from the notification may be automatically used, for example, to contact (for example, dial a phone number) persons represented in the notification. In a further example, the alert and/or notification may be automatically routed as input to an external system (for example, to be fed into a marketing campaign management system, a dealer management system, or a customer relationship management system).

In various implementations, filter or other comparison criteria changes may be made continuously, in real-time or substantially real-time, and/or in batch, to any filtering or other processes identified herein. In various implementations, changes to or records generated in any databases described herein may be evaluated continuously, in real-time or substantially real-time, and/or in batch. In various implementations, notification may be generated and/or sent continuously, in real-time or substantially real-time, and/or in batch.

In various implementations, the first data store 104, the second data store 106, the third data store 108, the fourth data store 114, the purchased vehicle database records 1004, the garaged vehicle database records 1010, and the loyalty database records 1018, and/or any combination of these databases or other databases and/or data storage devices of the system may be combined and/or separated into additional databases.

III. Dynamic Event Analysis System—Example Use Case—Vehicle Loyalty System

As discussed above, FIG. 1B provides an embodiment of a data flow process for a dynamic event analysis system 112 using the example use case. The following provides additional information about an overview of an embodiment of the dynamic event analysis system using the example use case of a vehicle loyalty system.

A decision of buying or leasing a vehicle generally involves a consumer identifying and accounting for various preferences or desired attributes for the vehicle. In some embodiments, the decision may rely or depend on the consumer's experience(s) with a particular make, model, or other aspect of the vehicle based on prior acquisition (for example, vehicle purchase or lease) or use. In some instances, the consumer's preferences or desired attributes and the consumer's experience(s) may be interdependent, since the consumer's preferences or desired attributes may be affected by the prior vehicle purchase or lease experiences and/or prior vehicle ownership. For example, the consumer may desire attributes that were found on a previous vehicle or that were absent from the previous vehicle.

A third party (for example, a manufacturer or a dealer) may use various systems to track the consumer's purchase or lease. Currently, some computer systems store data associated with about consumer vehicle purchase or lease events based on publicly available information. Other systems (for example, specific dealer systems) store data associated with consumer vehicle purchase or lease loyalty as they relate to the specific dealers. However, interconnecting these systems provides inconsistent information that does not align and may lead to incorrect analysis, and, thus, prevents the use of the combined data for more detailed and more accurate tracking of additional loyalty levels. Therefore, third parties are unable to track and identify consumer loyalty of dealers and manufacturers alongside various vehicle preferences, and methods and systems for providing such improved tracking of purchase and/or lease loyalty are desired.

As used herein, the term "consumer" may generally refer to a party purchasing or leasing a vehicle from another party. Furthermore, as used herein, the consumer may have purchased or leased a vehicle (or be interested in purchasing or leasing a vehicle). The vehicle may be a new vehicle, a used vehicle, or a certified pre-owned ("CPO") vehicle. However, the consumer may have purchased, rented, leased, bartered for, or otherwise acquired (or be interested in purchasing, renting, leasing, bartering for, or otherwise acquiring) another good (whether tangible or virtual) besides a vehicle, for example furniture, a home, a marine vehicle, downloadable application, music files, or similar goods which may generally be considered to be tied to a tracked loyalty parameter (for example, manufacturer, model, style, type, and so forth). For simplicity, a consumer activity described herein will be directed to an example use case using a vehicle purchase or lease as an example, though other similar activities as those described above are contemplated and features of the dynamic event analysis system may be used with a wide range of data sets.

Dealers and other entities (dealers) that sell or lease vehicles to consumers often desire to better understand the market in which they operate, the vehicles that they sell or lease, and the consumers that purchase or lease their vehicles. Information that leads to better understandings may provide critical details regarding habits of their consumers, allowing the dealers to better tailor services and/or products to their existing consumers. Additionally, similar information may be used to identify potential consumers in the market (for example, local region, and so forth) and tailor offers, services, and/or products with hopes of acquiring new consumers. Aggregating such information into an easy to understand interactive data view or report may be useful to dealers to easily understand consumer activity.

In some embodiments, this information may be used to measure and report consumer repurchase activity. For example, a generated report may track and indicate particular or general consumer return to market data (for example, frequency, dates, and so forth), dealer loyalty, brand loyalty, and conquest and/or defection information specific to the dealer or entity. A dealer that is looking to improve upon sales or leases of vehicles may request a report that includes this information in order to identify potential areas of growth. In some embodiments, the report may be requested by a manufacturer (for example, a regional office) looking to track regional activity and identify regional opportunities. In some embodiments, the information aggregation, modeling, and report generating may be performed by a third party (for example, party other than the dealer or the manufacturer).

In some embodiments, this information may be used to measure and report consumer repurchase activity. For example, a generated report may track loyalty of the consumer and may identify the consumer's return activity (for example, "loyalty") to a particular manufacturer, make, model, dealer, and so forth. The loyalty may identify multiple, historical transactions of the consumer tied to one of the above. Identification of consumer loyalty may be based, at least in part, on vehicle history records or other records that indicate the consumer's prior vehicle purchase or ownership history. As discussed herein, "garaged vehicles" may include vehicles that the consumer already owns or has previously owned, regardless of whether the consumer parks/parked the vehicles in a garage. For example, if the consumer owns three cars and purchases a fourth vehicle, for the purposes of the loyalty determination, the consumer will have three garaged vehicles and the one new vehicle. Accordingly, the loyalty determination may be made by comparing the new vehicle purchase with the garaged vehicles' details. In some embodiments, the garaged vehicle may be any vehicle registered to a household or owned by someone in the household. In some embodiments, the garaged vehicle for the consumer may be any vehicle registered to the consumer's household, regardless of whether the consumer is the owner or driver of all or any vehicles in the consumer's household. Thus, the garaged vehicle may be parked in the consumer's garage or may just be owned or registered by someone in the consumer's household.

Figure 2A:
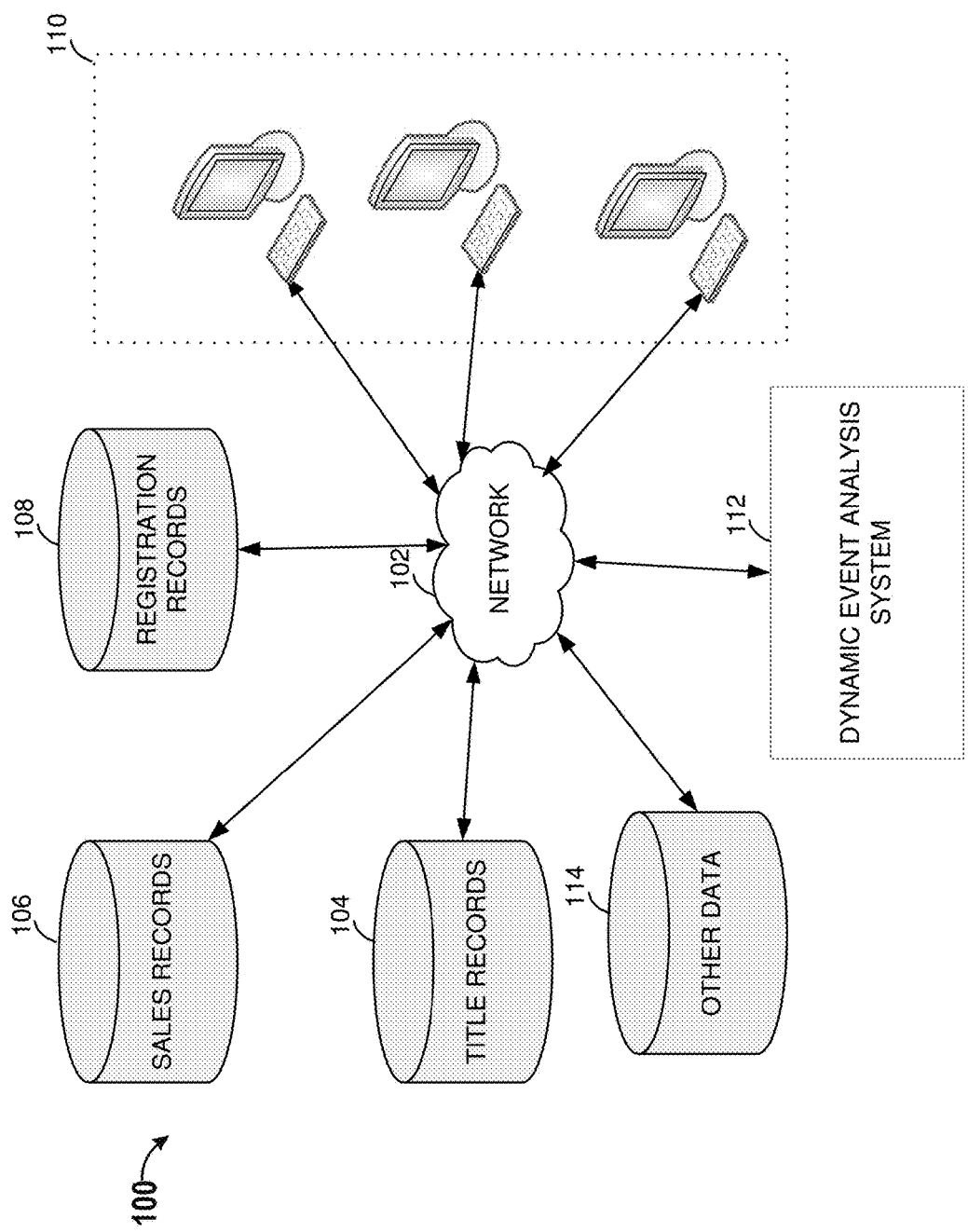
FIG. 2A illustrates a high-level view of example third party external system, which feed data into a dynamic event analysis system, according to an embodiment.

IV. Additional Example Implementations of the Dynamic Event Analysis System a. System Overview FIG. 2A illustrates one possible organization of a system 100 that can utilize a dynamic event analysis system 112 in conjunction with information from a plurality of databases, in accordance with an exemplary embodiment.

The system 100 comprises the dynamic event analysis system 112 interfacing with various components, including a network 102, a title records database 104, a sales records database 106, a registration records database 108, another database 114, and user terminals 110. Additionally, communication links are illustrated enabling communication among the components of system 100 via the network 102. The user terminals 110 are illustrated as being communicatively coupled to the dynamic event analysis system 112 (for example, via the network 102), though the dynamic event analysis system 112 may be integrated into the user terminals 110 or vice versa, or may be accessible via a local communication link. Furthermore, in some embodiments, one or more of the data stores 104, 106, 108, 114 described herein may be combined into a single data store that is local to the user terminals 110 or the dynamic event analysis system 112 or remote from the user terminals 110 and the dynamic event analysis system 112. In some embodiments, two or more of the components described above may be integrated. In some embodiments, one or more of the components may be excluded from the system 100 or one or more components not shown in FIG. 2A may be included in the system 100. The system 100 may be used to implement systems and methods described herein.

The illustrated databases are merely demonstrative of various additional databases that may provide information for use as described herein. The databases 104, 106, 108, 114, the user terminals 110, and the dynamic event analysis system 112 may be configured to communicate with each other via the network 102. The network 102 may include one or more mediums (for example, wired, wireless, or other) or standards (for example, 802.11a, Bluetooth, and so forth) of communication depending on the implementation. Accordingly, the databases 104, 106, 108, 114, the user terminals 110, and the dynamic event analysis system 112 may be proximally located (for example, within the same building) or separated by great distances (for example, located in different states, and so forth). In some embodiments, one or more additional components may be included as part of the network diagram 100 and configured to communicate with one or more components of the network 102. The user terminals 110 or the dynamic event analysis system 112 may comprise any computing device configured to transmit and receive data and information via the network 102 for an entity and may be located in different places and/or used by different persons on behalf of different entities. An entity may be an individual person, or an institution such as a business, a non-profit organization, an educational institution, an automobile dealer, a vehicle manufacture, a financial institution, and so forth. In some embodiments, the user terminals 110 may include or have access to one or more databases (for example, the first data store 104 and the second data store 106) that include various records and information that may be used to generate customized outputs. In some embodiments, the user terminals 110 may be accessible locally as well as remotely via the network 102. The user terminals 110 may create the customized outputs based on events associated with potential clients (for example, historical data, vehicle, or life events described herein). These events (and corresponding information) may be used to dynamically generate models for predicting when to engage potential clients to provide better value to the certain vehicles and improve likelihood of completing a transaction with the potential client.

The title records database 104 may comprise one more databases of title records. For example, the state of California may have a title records database 104 in which it stores all information relating to vehicle titles. The title records database 104 may include information provided by or associated with consumers who purchase or lease vehicles, dealers or individuals who sell or lease vehicles to consumers, or individuals or other entities otherwise involved in such vehicle transactions (for example, insurance companies, financial institutions, and so forth). The title records database 104 may include information generally included on a vehicle title or otherwise associated with a vehicle title, including, but not limited to: vehicle manufacturer, model, age, transaction type (for example, new or used purchase/lease), mileage, body style, any associated financial obligations and associations, and buyer name and address. In some embodiments, the title records database 104 may include information regarding the seller (for example, seller name and address, dealer association, information from the seller's previous purchase, and so forth). In some embodiments, the title records database 104 may include information from one or more of an industry publication database, a safety ratings database, and a vehicle specification database. In some embodiments, the title records database 104 may include millions of records and may be searchable or accessible according to a vehicle identification number (VIN), license plate, consumer, dealer, financing institution, vehicle type, vehicle manufacturer, or other unique or generic record identifier. While one title records database 104 is shown in FIG. 2A, it is recognized that there may be multiple title record databases, for example, title record databases for multiple states within the United States.

The sales records database 106 may comprise one or more databases of sales records. For example, a financial institution or dealer may manage a database including records of all sales in which the institution or dealer has been involved. Such records may include information of the parties involved (seller/lessor, buyer/lessee) and details of the vehicle involved in the record (for example, manufacturer, model, and so forth), among other information (for example, details of the financing, and so forth). In some embodiments, the sales records database 106 may include information from one or more of a third-party database, an industry publication database, a safety ratings database, and a vehicle specification database. In some embodiments, the sales records database 106 may include millions of records. Accordingly, the sales record database 106 may be searchable or accessible according to vehicle identification numbers (VINs), license plate numbers, consumer information, dealer information, financing institution, vehicle type, vehicle manufacturer, or other unique or generic record identifier. While one sales records database 106 is shown in FIG. 2A, it is recognized that there may be multiple sales records databases, for example, sales records databases for multiple dealers, manufactures, and so forth.

The registration records database 108 may comprise one or more databases of vehicle registration records. For example, the registration records database 108 may comprise a motor vehicle department database including information regarding vehicles currently and/or previously owned by a particular consumer. Additionally, the registration records database 108 may include information regarding duration of previous vehicle ownership, any known reasons for previous vehicle transactions, and so forth. In some embodiments, the registration records database 108 may include registration records of insurance companies or auto clubs. In some embodiments, the registration records database may include details regarding other vehicles or consumers/drivers associated with the consumer. In some embodiments, the registration records database 108 may include information regarding vehicle preferences of the consumer or other consumers associated with the consumer. In some embodiments, the registration records database 108 may be searchable or accessible according to a vehicle identification number (VIN), license plate, consumer, dealer, financing institution, vehicle type, vehicle manufacturer, or other unique or generic record identifier. While one registration records database 108 is shown in FIG. 2A, it is recognized that there may be multiple registration record databases, for example, registration record databases for multiple states within the United States.

In some embodiments, one or more of the databases 104, 106, 108, 114 may include one or more of state registration data, state and/or federal tax data, and/or manufacturer sales (RDR) data.

The user terminals 110 may comprise any electronic terminal by which the dealer or entity desiring to acquire custom generated data regarding statistics of consumer loyalty and purchasing trends (for example, one or more of consumer return to market, dealer loyalty, manufacturer loyalty, vehicle type loyalty, or similar statistics) may submit a request. For example, the user terminals 110 may comprise one or more of a laptop, a desktop, a tablet, a mobile phone, a PDA, or any other computing device with which the consumer may access the network 102. In some embodiments, the user may be an entity at a dealer, a manufacturer, an insurance company, and so forth. The user terminals 110 may provide access to the dynamic event analysis system 112 via the network 102.

The dynamic event analysis system 112 may comprise any electronic system that generates the statistics of consumer loyalty and purchasing trends. In some embodiments, the dynamic event analysis system 112 may comprise one or more computing components that interface with a plurality of databases and acquires information from one or more records within the plurality of databases. The dynamic event analysis system 112 may apply a plurality of rules to the acquired information and generate the reports based on the information and rules and/or generate encrypted data packets based on the customized data sets which provide instructions for rendering secure interfaces and data feeds based on the customized data. In some embodiments, the dynamic event analysis system 112 may apply the rules and generate the report or encrypted data packets automatically based on a trigger indicating a new vehicle sale or new record that appears in one or more of the databases 104, 106, 108, 114. The dynamic event analysis system 112 may be configured to automatically transmit the report or encrypted data packets to one or more of the user terminals 110 if of the type requested.

b. Dynamic Event Analysis System Components

Figure 2B:
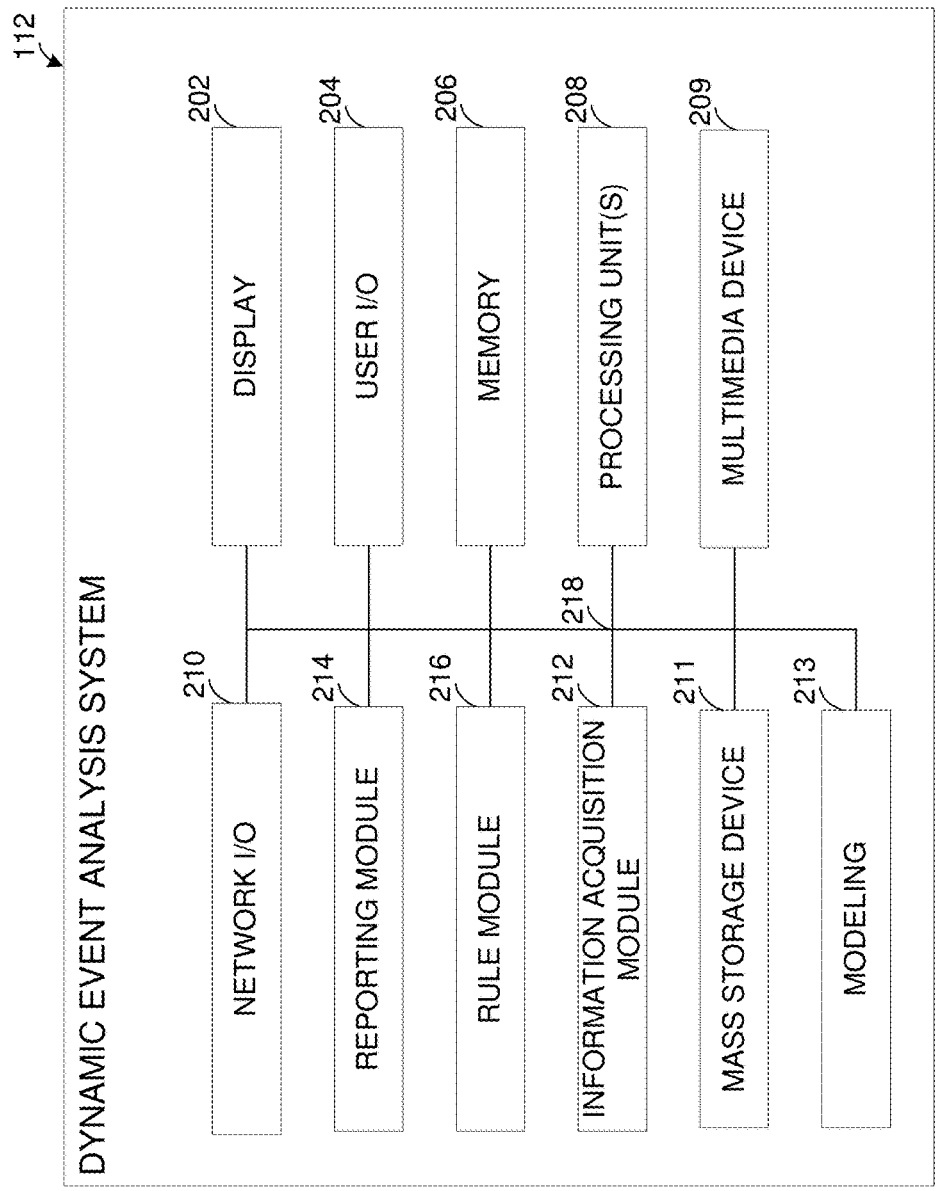
FIG. 2B is a block diagram corresponding to an aspect of a hardware and/or software component of an example embodiment of a dynamic event analysis system.

FIG. 2B is a block diagram corresponding to an aspect of a hardware and/or software component of an example embodiment of the dynamic event analysis system of FIG. 2A.

In some embodiments, certain modules described below, such as a user input/output (I/O) module 204, an information acquisition module 212, a model generating module 213, a notification module 214, a modeling (for example, model applying) module 215, or a rule (for example, rule or rubric applying) module 216 may be included with or combined with various other components of the dynamic event analysis system 112. Additionally, other components (not shown) may be included as part of the dynamic event analysis system 112.

In an embodiment, the various modules of the dynamic event analysis system 112 may be stored on or integrated with a component of the dynamic event analysis system 112 itself, or on a component or computer readable storage media separate from the dynamic event analysis system 112 and in communication with the dynamic event analysis system 112 via the network 102 or other appropriate means.

The dynamic event analysis system 112 may include, for example, a computer that is IBM, Macintosh, or Linux/Unix compatible or a server or workstation controlled by operating system software, such as Windows XP, Windows Vista, Windows 7, Windows 8, Windows Server, Unix, Linux, SunOS, Solaris, iOS, Android, Blackberry OS, or other similar operating systems. In Macintosh systems, the operating system may be any available operating system, such as MAC OS X. In other embodiments, the dynamic event analysis system 112 may be controlled by a proprietary operating system. Conventional operating systems control and schedule computer processes for execution, perform memory management, provide file system, networking, I/O services, and provide a user interface, such as a graphical user interface ("GUI"), among other things.

In some embodiments, the dynamic event analysis system 112 comprises one or more servers and/or database systems. In some embodiments, the dynamic event analysis system 112 includes one or more displays 202, the user I/O module 204, memory 206, central processing units ("CPUs") 208, a multimedia device 209, network I/O interface 210, mass storage device 211, an information acquisition module 212, a model generating modules 213, a notification module 214, a modeling module 215, a rule module 216, and bus 218. One or more of the components or modules in the dynamic event analysis system 112 may include components, such as hardware and/or software components, object-oriented software components, class components and task components, processes, functions, attributes, procedures, subroutines, segments of program code, drivers, firmware, microcode, circuitry, data, databases, data structures, tables, arrays, and variables. In the embodiment illustrated in FIG. 2B, the dynamic event analysis system 112 may be configured to execute the various modules to perform the associated methods and/or processes as described herein. In general, the dynamic event analysis system 112 may be configured to receive a request for a report or encrypted data packets from an entity, generate the report, and provide the generated report or encrypted data packets to the requesting entity.

The display 202 may comprise one or more display devices, such as a monitor, that allows the visual presentation of data and monitoring of functionality of the dynamic event analysis system 112. More particularly, the display 202 may provide for the presentation of GUIs, application software data, and multimedia presentations, for example.

The user I/O module 204 may comprise a keypad, a microphone, a touchpad, a speaker, a touchscreen, and/or any other commonly available input/output (I/O) devices and interfaces. The user I/O module 204 may include any element or component that conveys information to or receives information from the user terminals 110 or an entity desiring a report. In some embodiments, the user I/O module 204 includes the display 202.

In some embodiments, the user I/O module 204 may be stored in the mass storage device 211 as executable software code that is executed by the CPU 208. The user I/O module 204 may perform the various methods and/or processes as described herein. The user I/O module 204 may be configured to generate, provide, and/or operate user interfaces of various types. In some embodiments, the user I/O module 204 constructs pages or displays to be displayed in a web browser or computer/mobile application. In some embodiments, the user I/O module 204 may provide an application or similar module for download and operation on the user terminals 110, through which the user and the dynamic event analysis system 112 may interact. The pages may, in some embodiments, be specific to a type of device, such as a mobile device or a desktop web browser, to maximize usability for the particular device.

For example, the user I/O module 204 may be configured to automatically detect a type of computing device that is requesting reports, such as a mobile phone, a desktop computer, and so forth. This detection may be made via an identifier that is communicated with the request. In some embodiments, the detection may be based on a user selection when the user interacts with the dynamic event analysis system 112 for the first time. According to the detection, the user I/O module 204 may determine to send information formatted optimized for the proper computing device being used by the user. Such functionality may improve accessibility to the dynamic event analysis system 112 by the user. In some embodiments, the request for a report that is received may include one or more parameters or information (for example, fields) that the report should include or be based on. For example, the request may include a manufacturer, model, or type on which the user may want the report based.

In some embodiments, the user I/O module 204 may also act alongside the notification module 214 to provide the generated report with a client-side application running on the user terminals 110, such as a mobile phone application (an "app"), a standalone desktop application, or user communication accounts (for example, e-mail, SMS messaging, and so forth) and provide data as necessary to display information included in the generated report. When interacting with the client-side application, the user I/O module 204 may be configured to format data for communication according to specifications and standards associated with that application. For example, the user I/O module 204 may be configured to format all communication messages according to specific information elements that may be understood by the application on the user terminals 110. Accordingly, information may be securely and efficiently communicated back and forth when both sides know the appropriate specifications and standards.

In some embodiments, the user I/O module 204 may include the network I/O interface 210 or a similar communication interface with various external devices. For example, the dynamic event analysis system 112 may be electronically coupled to the network 102 (FIG. 1), which comprises one or more of a LAN, WAN, and/or the Internet. Accordingly, the network I/O interface 210 may include an interface allowing for communication with the network 102, for example, via a wired communication port, a wireless communication port, or a combination thereof. In some embodiments, one or both of the user I/O module 204 and the network I/O interface 210 may be configured to receive a request for a report from one or more of a dealer, manufacturer, and so forth, regarding consumer loyalty.

The memory 206, which may include both read-only memory (ROM) and random access memory (RAM), may provide instructions and data to the CPU 208. For example, inputs received by one or more components of the dynamic event analysis system 112 may be stored in the memory 206. A portion of the memory 206 may also include non-volatile random access memory (NVRAM). The CPU 208 typically performs logical and arithmetic operations based on program instructions stored within the memory 206. The instructions in the memory 206 may be executable to implement the methods described herein.

The CPU 208 may control operation of the dynamic event analysis system 112. The CPU 208 may also be referred to as a processor. The CPU 208 may comprise or be a component of a processing system implemented with one or more processors. The one or more processors may be implemented with any combination of general-purpose microprocessors, microcontrollers, digital signal processors ("DSPs"), field programmable gate array ("FPGAs"), programmable logic devices ("PLDs"), controllers, state machines, gated logic, discrete hardware components, dedicated hardware finite state machines, or any other suitable entities that can perform calculations or other manipulations of information.

The multimedia device 209 may include various components configured to encode, decode, and communicate media information, such as speakers, video cards, graphics accelerators, cameras, and microphones.

The mass storage device 211 may store software and/or information (for example, the acquired information, the business rules, and/or the generated reports). Software shall be construed broadly to mean any type of instructions, whether referred to as software, firmware, middleware, microcode, hardware description language, or otherwise. Instructions may include code (for example, in source code format, binary code format, executable code format, or any other suitable format of code). The instructions, when executed by the one or more processors, cause the processing system to perform the various functions described herein. Accordingly, the dynamic event analysis system 112 may include, for example, hardware, firmware, and software, or any combination therein. The mass storage device 211 may comprise a hard drive, diskette, solid state drive, or optical media storage device.

In some embodiments, the mass storage device 211 may store received information (for example, received via the information acquisition module 212) or reports generated by the notification module 214 using a unique household key or identifier to link associated vehicles (for example, part of the same household) together for analysis or comparison or application of one or more rules.

The information acquisition module 212 may be configured to automatically parse, tag, identify, and/or acquire information regarding recent vehicle transactions for use in generating the report. For example, the recent transaction may include a new, used, or certified pre-owned vehicle purchase or registration. This information may be obtained from any of the databases 104, 106, 108, 114 of FIG. 1. In some embodiments, the information obtained from the databases 104, 106, 108, 114 may include at least a portion of the information illustrated in Table 1.

TABLE 1

| Field | Description |
| --- | --- |
| PURCHASED_VIN | Vehicle Identification Number associated with the purchased vehicle |
| PURCHASED_MODELYEAR | VIN derived model year associated with the purchased vehicle |
| PURCHASED_MANUFACTURER | VIN derived Manufacturer associated with purchased vehicle |
| PURCHASED_MAKE | VIN derived Make associated with the purchased vehicle |
| PURCHASED_MODEL | VIN derived Model associated with the purchased vehicle |

TABLE 1-continued

| Field | Description |
| --- | --- |
| PURCHASED_TRIM | VIN derived Trim associated with the purchased vehicle |
| PURCHASED_VEHICLE_SIZECLASS | Defined Vehicle Size Class (Heavy Duty, Medium Duty, Full, Mid-Size, Small, Sport, Undefined) |
| PURCHASED_VEHICLE_TYPE | Defined Vehicle Type (Bus, Car, Utility, Tractor, Truck, Van, Undefined) |
| PURCHASED_VEHICLE_SUBTYPE | Defined Vehicle Subtype (Sedan, SUV, Pickup, Coupe, Hatchback, Minivan, Full Size Van, Wagon, CUV, Convertible, Unknown, Straight Truck, Tractor, Chassis Cab, Cutaway, Incomplete Vehicle, School Bus, Motor Home, Other Van, Step Van, Other Bus, Glider, Parcel Van, Stripped Chassis, Fire Truck, Yard Tractor, Van, Military Truck |
| PURCHASED_VEHICLE_CLASS | Defined Vehicle Class (Non-Luxury, Luxury, Undefined, Heavy Duty, Medium Duty, Exotic |
| PURCHASED_TRANS_TYPE | Defined value identifying the purchased vehicle as bought New or Certified Used. |
| PURCHASED_FINANCE_TYPE | Finance type associated with purchased vehicle (Purchase, Lease, Unknown) |
| PURCHASED_LENDER_TYPE | Lender type associated with purchased vehicle (Captive, Bank, Credit Union, Other, Unknown) |
| PURCHASED_LENDER_NAME | Lender name associated with purchased vehicle (Chase, Bank of America, Toyota Financial, and so forth) |
| PURCHASED_IMPORT | Import identifier as defined by EVD |
| PURCHASED_DOORCOUNT | Number of doors associated with the purchased vehicle (2,3,4,5, Unknown) |
| PURCHASED_FUEL_TYPE | Fuel type associated with purchased vehicle (Diesel, Gasoline/Flex, Hybrid, Electric, Natural Gas, Methanol, Propane, Unknown, Undefined) |
| PURCHASED_DRIVE_TYPE | Drive type associated with the purchased vehicle (4WD/AWD, FWD, RWD, Other, Undefined) |
| PURCHASED_CYLINDER_COUNT | Number of cylinders associated with the purchased vehicle (3,4,5,6,8,10,12,Undefined) |
| PURCHASED_PURCHASE_DATE | The date of purchased vehicle acquisition. Date must closely reflect the date the owner took possession of the vehicle, not the date of the report month. |
| PURCHASED_DEALER_CODE | OEM Dealer code for the purchased vehicle |
| PURCHASED_DEALERLOCATION_CODE | assigned dealer location code |
| PURCHASED DEALER NAME | OEM defined dealer name |
| PURCHASED_CENSUS_TRACT | Census tract of the purchased vehicle owners address |
| PURCHASED_ZIP_CODE | Zip code of the purchased vehicle owners address |
| PURCHASED_STATE | State of the purchased vehicle owner's address. Should include Washington DC and Puerto Rico in addition to the 50 states. |
| PURCHASED_FLEET_IND | Indicator identifying the purchaser as an Individual or Organization. |

In some embodiments, the information acquisition module 212 may generate a request for the information in Table 1 from one or more of the databases 104, 106, 108, 114. In some embodiments, the request may provide a particular communication element with appropriate fields, bits, or values for each of the fields indicated in Table 1. For example, an information element communicated by the information acquisition module 212 to one of the databases 104, 106, 108, 114 may include header information identifying that the communication is an information request and requesting the database 104, 106, 108, 114 to provide the information as indicated in the information element. In some embodiments, one or more of the fields identified above is newly requested in such information requests. In some embodiments, additional information regarding the consumer's other vehicle or history of vehicle may be requested as part of the same request or as an additional request.

In some embodiments, the information acquisition module 212 may use a VIN or other vehicle identifying information as the basis for the information request. For example, the VIN is the first field illustrated in Table 1. Alternatively, the consumer's name, address, or other identifying information may be the basis of the information request. Additionally, any of the other fields of Table 1 may be used in an inquiry and may return all results including a particular value in the requested field. For example, an inquiry for all Honda vehicles purchased may return all Honda vehicle purchases stored in the databases 104, 106, 108, 114. In some embodiments, the data received from the database 104, 106, 108, 114 may be stored in the memory 206 or the mass storage device 211. This stored data may be used by the notification module 214 as discussed herein. In some embodiments, the received data may not be stored and may instead be provided to the notification module 214 directly via the bus 218. In some embodiments, after sending the information request, the information acquisition module 212 may receive an acknowledgement or denial of the request before receiving a response including any of the requested information. In some embodiments, a message flow diagram of the requests and responses may show communication between the information acquisition module 212 and the databases 104, 106, 108, 114 and the use of that information by various components of the dynamic event analysis system 112.

The model generating module 213 may generate one or more models based on one or more of the request received via the user I/O module 204 or the network I/O module 210 and the data acquired by the information acquisition module 212. In some embodiments, the model generating module 213 may determine what information is to be acquired by the information acquisition module 212 based on the request received and the model generated by the model generating module 213. In some embodiments, the model generating module 213 may generate a model particular for each request received based on various parameters of the received request.

In some embodiments, based on the parameters of the received request (for example, an area of interest, manufacturer(s) of interest, model(s) of interest, and so forth) the model generating module 213 may coordinate the acquisition of information via the information acquisition module 212. In some embodiments, the based on the request, the model generating module 213 may generate a model. The model may include various rules (for example, rules used by the rule model 216) and may generate various information used by the notification module 214 to generate the report. In some embodiments, the information acquisition module 212 and the rule module 216 may independently determine what information to acquire and rules to apply, respectively, based on details of the model generated by the model generating module 213.

Figure 5A:
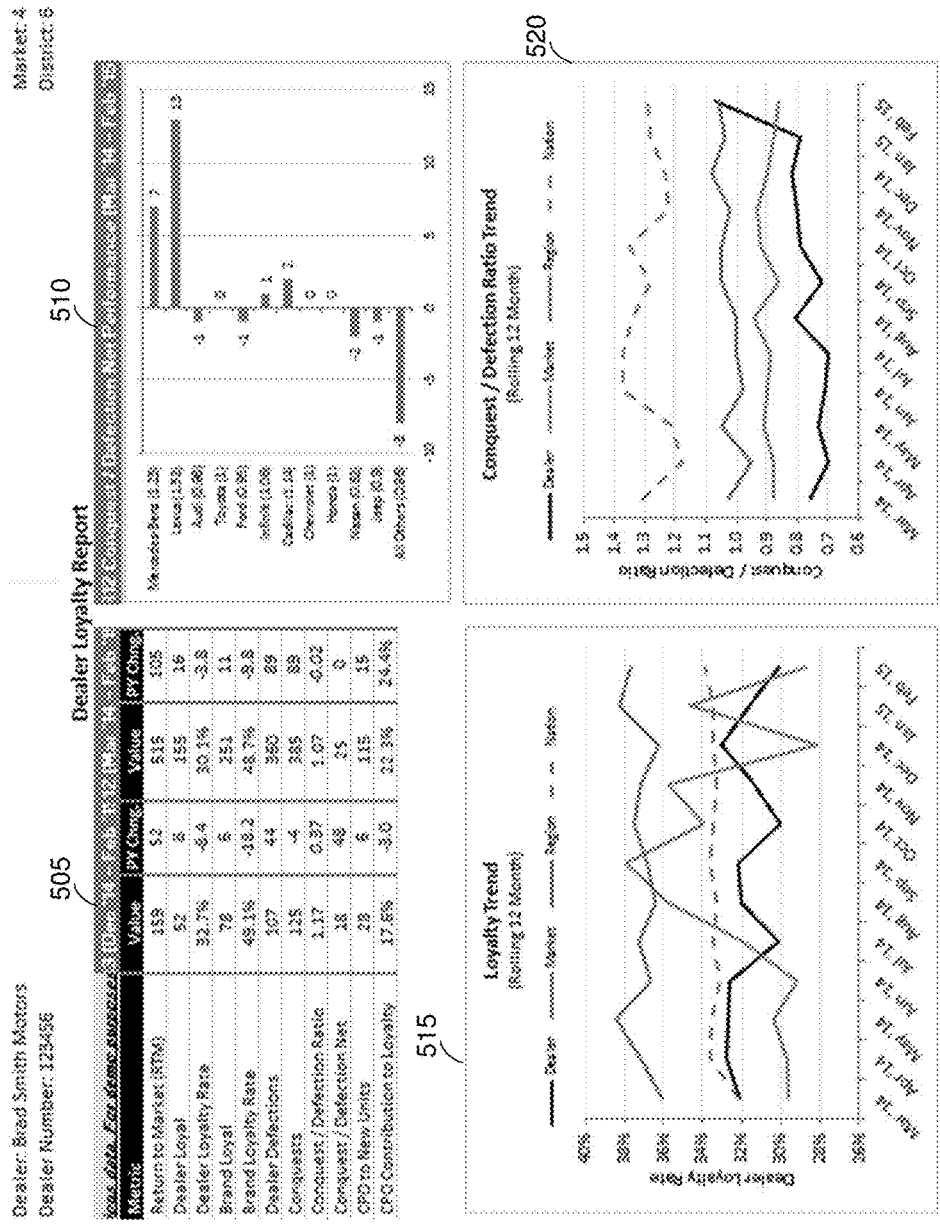
FIGS. 5A and 5B are embodiments of user interface modules generated as part of the method disclosed in FIG. 3.
Figure 5B:
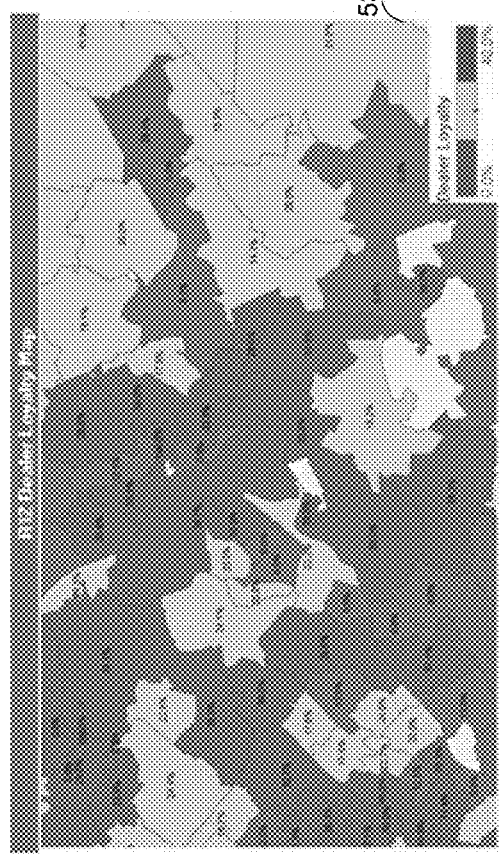

The notification module 214 may generate one or more reports based on information acquired by the information acquisition module 212, the model generated by the model generating module 213, the model applied by the modeling module 215, and results of rules applied by the rule module 216. For example, the notification module 214 may generate a report or encrypted data packets including information as illustrated in FIGS. 5A and 5B. In some embodiments, the information used to generate the report may include at least some of the information illustrated in Table 1 combined with data pulled from multiple similar and/or corresponding reports. For example, the report generated by the notification module 214 may include information from all vehicles sold by a particular dealer, manufacturer, and so forth, within a particular time period (for example, three months or twelve months or some user defined time period). In some embodiments, the report generated by the notification module 214 may be generated in real-time using information that is acquired specifically for the report being generated. In some embodiments, the report may be generated based on information stored in the mass storage device 211 using information previously acquired for one or more other reports. In some embodiments, the report may comprise encrypted data packets based on the customized data sets which provide instructions for rendering secure interfaces and data feeds based on the customized data.

In some embodiments, the notification module 214 may coordinate the distribution of a generated report according to one or more reporting standards or directives. For example, the notification module 214 may coordinate providing the generated report to the dealer or manufacturer that requested the report, electronically or physically. The notification module 214 may further provide the information in the report to a third party to automatically allow for targeted distribution of advertisements, and so forth.

The rule module 216 may apply one or more rules used to generate results to include in the requested report. For example, the rule module 216 applies rules to pair a single purchased vehicle record with a garaged vehicle or previously purchased vehicle of the same consumer. Examples of the rules may include:

- Does the new vehicle from the vehicle sale record belong to the same household as another record?
- Is the new vehicle the same model as another record of the household?
- Is the new vehicle the same make as another record of the household?
- Is the new vehicle from the same dealer as another record of the household?
- Is the new vehicle the same manufacturer as another record of the household?
- Is the new vehicle the same class as another record of the household?
- Is the new vehicle the same subtype as another record of the household?
- Is the new vehicle the same type as another record of the household?
- Is the new vehicle the same size class as another record of the household?
- Was the new vehicle purchased new, used, or CPO?
- Combinations of the above After one or more of the rules are applied, the results may be stored in the memory 206 or the mass storage device 211 for use in the report.

The various components of the dynamic event analysis system 112 may be coupled together by a bus system 218. The bus system 218 may include a data bus, for example, as well as a power bus, a control signal bus, and a status signal bus in addition to the data bus. In different embodiments, the bus could be implemented in Peripheral Component Interconnect ("PCI"), Microchannel, Small Computer System Interface ("SCSI"), Industrial Standard Architecture ("ISA") and Extended ISA ("EISA") architectures, for example.

In addition, the functionality provided for in the components and modules of the dynamic event analysis system 112 may be combined into fewer components and modules or further separated into additional components and modules than that illustrated in FIG. 2B.

V. Example Use Case—Vehicle Data

The system 100 may be used in a variety of environments to perform database updates and to dynamically generate custom databases and data sets. As one non-limiting example use case, which is discussed above and herein, the system 100 may be used to process vehicle data. Parties in vehicle sales (for example, dealers, manufacturers, lenders, and so forth) are always looking for new clients or customers. In some instances, the new clients may be people who are buying or leasing new vehicles. Some efforts for identifying potential clients may include sending pre-screening offers to invite or encourage customers to visit a dealership or browse an inventory for purchase or lease. Other efforts may involve reviewing records to identify loyalty shown by consumers in prior vehicle purchases and who may show similar loyalties in future purchases. Consumers that may show similar loyalties in future purchases may be identified as potential clients.

However, such current efforts in identifying such loyalty may be expensive, inefficient, error-prone, and time consuming (for example, taking up time consuming data processing and computations). Furthermore, the results of such efforts to identify potential clients may be unreliable with regard to efficacy of accurately identifying the potential clients (for example, clients that have previously shown loyalty over those that have not shown loyalty in vehicle purchases along with those clients who may purchase a new vehicle soon), especially when particular details of the potential clients (such as exhibited loyalty to a particular make, manufacturer, dealer, and so forth) are desired. Records regarding details of particular previous vehicle purchases may be available but may only include pieces of useful information that cannot be aggregated or analyzed with other details to generate useful customer information. For example, when trying to identify potential clients' loyalty trends, existing vehicle records and analysis may provide partial loyalty analysis of previous vehicle purchases without generating a loyalty score. However, these records and analysis may not include all details needed to be of value to the dealer or other user requesting the loyalty analysis. For example, such records may fail to provide a potential client's full name or address, details regarding the vehicle loyalty exhibited, and so forth. Furthermore, there may not be any associations between the existing records and recent purchase records, so the available information identified above may not be available for all the potential client's for whom existing records exist. For example, existing records may show that John has purchased a Lexus vehicle in May 2018 but not include any details regarding the vehicle type or vehicle types for other purchases John previously made. Similarly, records may provide details regarding Mary's vehicle type but not include any information regarding Mary's vehicles purchased when living at a different address or under a different name. Further, even though there may be some data sources that have full information, there may be regulatory restrictions as to who may access those data sources and requirements that dictate how such information and data sources may be accessed and/or used Thus, dealers and manufacturers that are generally interested in sales in a particular geographic area and/or of particular vehicle types, makes, or models may not be able to fully use the information from existing records and will be unable to target particular potential clients (for example, those within particular zip codes or with exhibited loyalties to a particular vehicle type, make, or model). Records including such useful details may not currently exist and may not be generated with accuracy under current (regulatory and other) frameworks.

Records from other sources may also provide details regarding the potential clients, such as household information as well as events in the potential clients' lives (life, vehicle, third party, and so forth). These records may be analyzed individually and in combination with each other to generate predictive models. These other sources may not include the specific third party file data, but may not be subject to the third party regulations. Thus, these other sources may be used to generate models to apply to vehicle purchase and lease events and generate new insights. For example, such modeling may identify which geographic regions have a large percentage of consumers that are likely to be ready to lease or purchase a vehicle. The modeling may dynamically leverage data from various sources to apply predictive insights that increase revenue opportunities by generating customized sets of geographic regions (for example, 90211, zip codes XXXXX+YYYY and GGGGG+HHHH) that the dealers and manufacturers may want to target. However, there may be some constraints on how the data can be used. In addition, the data that is needed from the client events may not interface well with some of the vehicle data sources.

Recent trends show used and new vehicle registrations growing at ever slowing rates. Accordingly, maintaining relationships with consumers with exhibited preferences as well as identifying potential clients that may be conquested based on exhibited preferences are becoming increasingly critical to continued growth. Saturation signaled by the reduced growth in used and new vehicle registrations may suggest that future growth in used and new vehicles may require attracting customers from competitors and protecting existing market share for continued growth. The dynamic modeling and reporting described herein may allow for identification and/or targeting of particular geographic increased benefit for the dealer or manufacturer (for example, high likelihood to leave a competitor or maintain existing loyalties) without having to overtax the dealer or manufacturer's computing systems.

In some embodiments, though vehicle purchases are used as examples herein, such targeting may be generated based on third party events, other vehicle events, or life events. Examples of third party events may include increases in third party scores, new trade lines, new third party inquiries, or third party events related to vehicle (for example, end of lease or financing terms, increase/decrease in equity, and so forth). Vehicle events may include insurance losses, major accidents or damage, title changes, thefts, recalls, and so forth. Life events may include address changes (for example, moves, home purchases, rentals, and so forth), birth of children, marriage, new jobs, graduation, birthdays, and so forth. Any of these events may be considered triggering events. Systems and methods may use such triggering events to identify potential targets, where a target is a potential client that is identified as someone likely to lease or purchase a vehicle (new or used) in a given geographic region within a given timeframe.

Thus, targeting may create a customized output based on dynamic modeling and reporting applied to varying inputs. The inputs may include one or more of geographic regions, variable vehicle information (for example, make, model, type, and so forth), and so forth. Outputs may be further be scored or ranked based on expected accuracy.

VI. Processing Loyalty Data—Example Use Case—Vehicle Data

Figure 3:
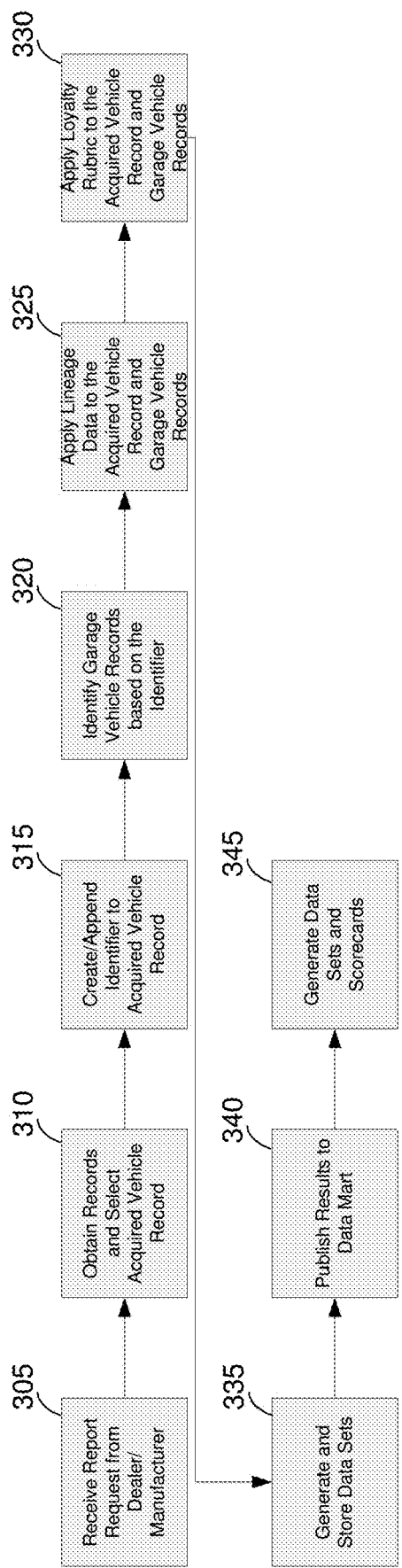
FIG. 3 is an example of one embodiment of a flowchart illustrating a method for processing data from multiple sources and dynamically applying rubrics based on the data from the sources.

FIG. 3 is an example of one embodiment of a flowchart for method, process, or data flow 300 for processing information from multiple sources and dynamically applying rubrics based on the data from the sources. For example, the method 300 could be performed by one or more of the CPUs 208 of the dynamic event analysis system 112, or one or more of the modules of the dynamic event analysis system 112. A person having ordinary skill in the art will appreciate that the method 300 may be implemented by other suitable devices and systems. Although the method 300 is described herein with reference to a particular order, in various aspects, blocks herein may be performed in a different order, or omitted, and additional blocks may be added. In some implementations, one or more blocks of the method 300 may be used for one or more steps depicted in the method 300. Moreover, the example set of rubrics discussed is just an example and other rules or rubrics may be used.

The method 300 begins at block 305. The block 305 includes receiving a request to generate a customized set of data analytics indicating loyalty metrics. The method 300 proceeds to block 310, where vehicle purchase records are acquired from one or more databases. The vehicle purchase records acquired may include all "new" vehicle purchases, regardless of whether the vehicle purchased was new, used, or CPO. In some embodiments, the information acquisition module 212 may request information as illustrated in the Table 1 herein. In some embodiments, one or more of the databases 104, 106, 108, 114 may be queried for the requested information. The purchase records may include, new, used, and CPO transactions. After the purchase records are acquired, one or more of the purchase records are selected for sorting and/or analysis. The method then proceeds to block 315.

Block 315 includes creating or appending a household identifier to each of the purchase records. If the vehicle in the record being sorted or analyzed belongs to a household that already exists in a database of the dynamic event analysis system 112 (for example, stored in the memory 206 or the mass storage device 211), then the record being sorted or analyzed may be appended with the unique identifier of that household. If the record belongs to a new household, then a unique identifier may be assigned to the record. In some embodiments, the association of the record with the household may be based on a surname and/or an address. In some embodiments, the unique household may be household-based, and not based on the individual. In some embodiments, the household identifier may follow the consumer over time to help identify lifetime buying patterns and behaviors. In some embodiments, the unique household identifier may be used to more easily identify records across various databases.

After a record is updated, the updated record may be locally stored (for example, in the memory 206) for long or short term durations. Long term storage may include saving for use in other reporting while short term storage may include saving until the current reporting is completed. The appended or updated record may then include the information of Table 1 plus the unique household identifier and the consumer information. After the household identifier is applied to the record, the method 300 proceeds to block 320.

Block 320 includes identifying other vehicles in the household of the vehicle of the purchase record based on the household identifier. In some embodiments, all vehicles currently in the garage of the consumer that purchased the "new" vehicle are returned by this process. Other vehicles that are identified as sharing the household identifier may have records including much or all of the information fields illustrated in Table 1. Alternatively, the existing vehicles in the household may comprise records including the information illustrated in Table 2 (plus consumer information).

TABLE 2

| | |
|---|---|
| OWNED_VIN | Vehicle Identification Number associated with the owned vehicle |
| OWNED_MODELYEAR | VIN derived model year associated with the owned vehicle |
| OWNED_MANUFACTURER | VIN derived Manufacturer associated with owned vehicle |
| OWNED_MAKE | VIN derived Make associated with the owned vehicle |
| OWNED_MODEL | VIN derived Model associated with the owned vehicle |
| OWNED_TRIM | VIN derived Trim associated with the owned vehicle |
| OWNED_VEHICLE_SIZECLASS | Defined Vehicle Size Class (Heavy Duty, Medium Duty, Full, Mid-Size, Small, Sport, Undefined) associated with the owned vehicle |
| OWNED_VEHICLE_TYPE | Defined Vehicle Type (Bus, Car, Utility, Tractor, Truck, Van, Undefined) associated with the owned vehicle |
| OWNED_VEHICLE_SUBTYPE | Defined Vehicle Subtype (Sedan, SUV, Pickup, Coupe, Hatchback, Minivan, Full Size Van, Wagon, CUV, Convertible, Unknown, Straight Truck, Tractor, Chassis Cab, Cutaway, Incomplete Vehicle, School Bus, Motor Home, Other Van, Step Van, Other Bus, Glider, Parcel Van, Stripped Chassis, Fire Truck, Yard Tractor, Van, Military Truck) associated with the owned vehicle |
| OWNED_VEHICLE_CLASS | Defined Vehicle Class (Non-Luxury, Luxury, Undefined, Heavy Duty, Medium Duty, Exotic) associated with the owned vehicle |
| OWNED_TRANS_TYPE | Defined value identifying the owned vehicle as bought New, Certified Used or Non-Certified Used. |
| OWNED_FINANCE_TYPE | Finance type associated with owned vehicle (Purchase, Lease, Unknown) |
| OWNED LENDER TYPE | Lender type associated with owned vehicle (Captive, Bank, Credit Union, Other, Unknown) |
| OWNED LENDER NAME | Lender name associated with owned vehicle (Chase, Bank of America, Toyota Financial, and so forth) |
| OWNED_IMPORT | Import identifier as defined by EVD for the owned vehicle |
| OWNED_DOORCOUNT | Number of doors associated with the owned vehicle (2,3,4,5, Unknown) |

TABLE 2-continued

| | |
|---|---|
| OWNED_VIN | Vehicle Identification Number associated with the owned vehicle |
| OWNED_FUEL_TYPE | Fuel type associated with owned vehicle (Diesel, Gasoline/Flex, Hybrid, Electric, Natural Gas, Methanol, Propane, Unknown, Undefined) |
| OWNED_DRIVE_TYPE | Drive type associated with the owned vehicle (4WD/AWD, FWD, RWD, Other, Undefined) |
| OWNED_CYLINDER_COUNT | Number of cylinders associated with the owned vehicle (3,4,5,6,8,10,12,Undefined) |
| OWNED_PURCHASE_DATE | The date of owned vehicle acquisition. Date must closely reflect the date the owner took possession of the vehicle, not the date of the report month or date title was issued. |
| OWNED_DEALER_CODE | OEM Dealer code for the owned vehicle |
| OWNED_DEALERLOCATION_CODE | Assigned dealer location code for the owned vehicle |
| OWNED_DEALER_NAME | OEM defined dealer name associated with owned vehicle |

After all the records for the household are collected (new purchase and previously owned), these records may be stored or sent for processing by the rule module 216 for loyalty determination. The method 300 then proceeds to block 325.

Block 325 includes identifying and applying a dealer lineage to each household. The dealer lineage may include a history of associations or codes of the dealer. For example, a particular dealer may move locations or change its dealer code or even change associations with particular manufacturers or makes. The dealer lineage may provide a more robust calculation of dealer loyalty results. In some embodiments, the dealer lineage may include a mapping of old dealer codes to new dealer codes. By applying the dealer lineage, one or more of the purchase record and the previously owned record(s) may, for example, be updated to include multiple dealer codes in the "dealer code" field. After the dealer lineage is applied, the method 300 proceeds to block 330.

Block 330 includes applying the rules to the records collected in block 320. In some embodiments, the rules may be applied by the rules module 216. The rules may be applied to pair the newly purchased vehicle with a previously owned (or garaged) vehicle. Further detail regarding the rules applied by the rules module 216 is provided with reference to FIG. 4. After the rules are applied to the records, the method 300 proceeds to block 335.

Block 335 includes storing intermediate datasets or electronic reports to the memory 206 or the mass storage device 211. The intermediate datasets or electronic reports may include details regarding the vehicle pair, if such a pairing was identified. The intermediate datasets or electronic reports may include the information from Tables 1 and 2 for the newly purchased and previously owned vehicles, respectively, as well as all associated data (for example, consumer information, and so forth). After the intermediate datasets or electronic reports are stored or saved, the method 300 proceeds to block 340.

Block 340 includes storing the results of the rules application of block 330 and the generated intermediate reports from block 335 in a database (not shown in the figures). In some embodiments, demographics on the consumer purchasing the "new" vehicle may be stored in the database, and/or in the records store of block 335. In some embodiments, historical demographics may be stored and/or appended as well. In some embodiments, demographic variables included are illustrated in Table 3. In some embodiments, the publishing may comprise further aggregating data from the database in a second database. In some embodiments, the second database may provide data for the reporting engine. In some embodiments, the reporting engine may obtain data from the database without needing the second database. In some embodiments, the storing of information as illustrated in blocks 335 and 340 may represent storage between different servers or processing systems. For example, the storing in block 335 may represent storing by a first server or system that may be more or better optimized for extensive processing and aggregation of records. The storing in block 340 may represent storing by a second server or system that may be more or better optimized for responding to real-time queries and generating instructions for secure interface displays.

The process may write record level detail to a "data warehouse" and/or the data may further aggregated to a "data mart", which can be accessed by the reporting engine.

TABLE 3

| Field | Description |
|---|---|
| PURCHASED_AGE | Age of the buyer |
| PURCHASED_GENDER | Gender of the vehicle buyer |
| PURCHASED_INCOME | Estimated household income of the vehicle buyer |
| PURCHASED_ETHNICITY | Ethnicity of the vehicle buyer (African-America, Asian, Hispanic, Other) |
| PURCHASED_MOSIAC | Mosaic segment name/code of the vehicle buyer or household. |

In some embodiments, a purchase indicated by the purchase record could be nullified and purchased vehicle may be returned. When this occurs, uses of the associated purchase record may be reviewed and any results obtained based on the associated purchase record may be removed from both the reports store and the database. After the results of the rules application are published to the database, the method 300 proceeds to block 345.

Block 345 includes generating a report and score card based on the intermediate reports from block 335 that are stored in the memory 206 or the mass storage device 211 or the database from block 340. Record level transactions are aggregated up to the specific report level of detail (dealer, make, and so forth). After the report is generated at block 345, the method 300 terminates.

VII. Application of Rules—Example Use Case—Vehicle Data

Figure 4:
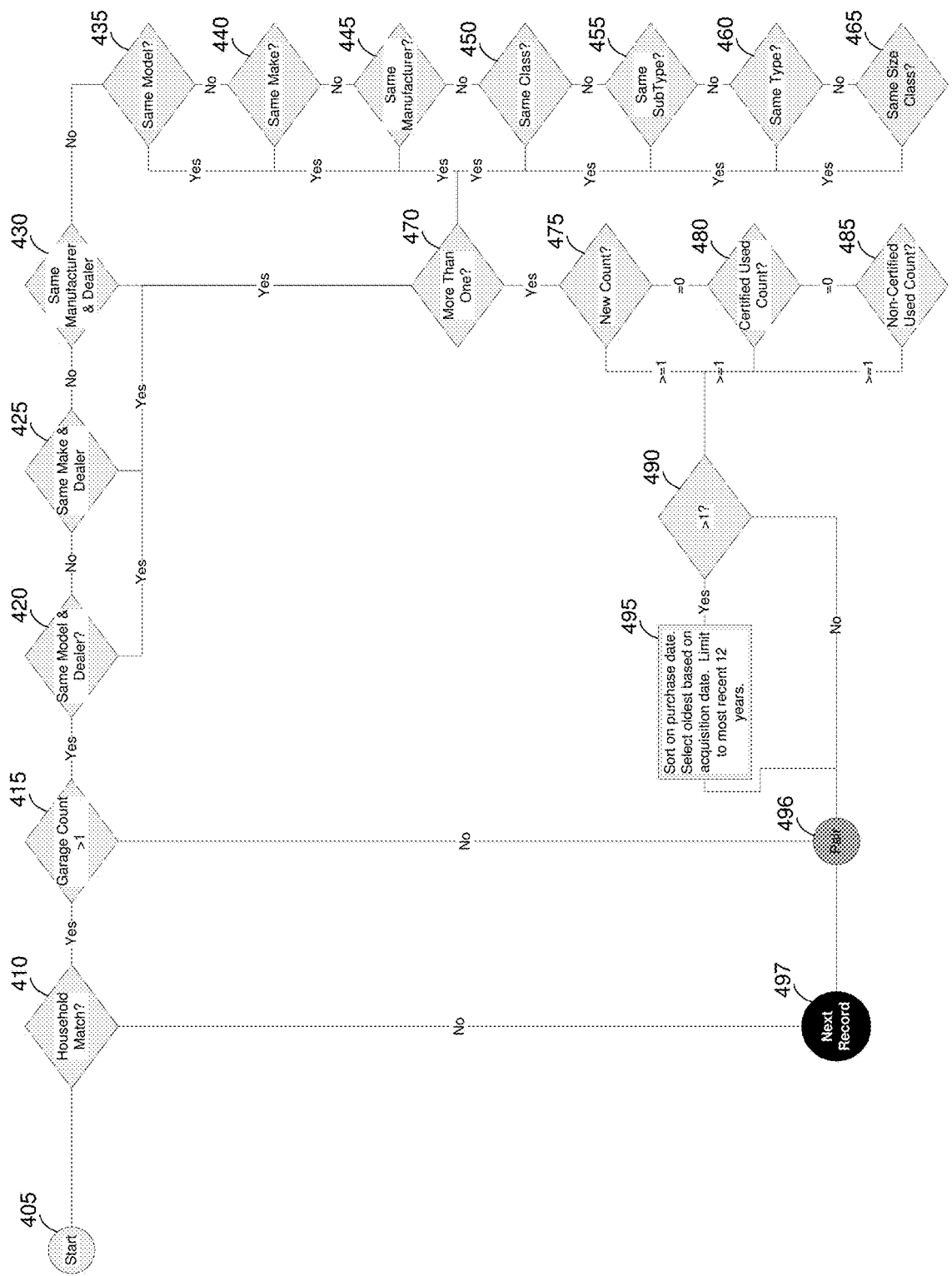
FIG. 4 is an example of one embodiment of a flowchart illustrating a method for processing information and dynamically applying rubrics as disclosed in FIG. 3.

FIG. 4 is an example of one embodiment of a flowchart illustrating a method 400 for processing information and dynamically applying rubrics as disclosed in FIG. 3. For example, the method 400 could be performed by the one or more of the CPU 208 of the dynamic event analysis system 112 one or more of the modules of the dynamic event analysis system 112 (for example, the rules module 216). A person having ordinary skill in the art will appreciate that the method 400 may be implemented by other suitable devices and systems. Although the method 400 is described herein with reference to a particular order, in various aspects, blocks herein may be performed in a different order, or omitted, and additional blocks may be added. In some implementations, one or more blocks of the method 400 may be used for one or more steps depicted in the method 400. The method 400 may determine whether paired or grouped records (for example, of a vehicle sharing a household identifier) show any loyalty for the particular household identifier. Application of the loyalty rules may pair a single purchased vehicle with a garaged vehicle based on loyalty aspects identified by the rules.

The method 400 begins at block 405 and proceeds to block 410. The block 410 includes confirming that the "new" purchase record belongs to the same household or garage as another vehicle. If this is confirmed at block 410, the method 400 proceeds to block 415. If the method 400 cannot confirm this, the method 400 proceeds to block 497.

Block 415 includes determining that the garage includes more than a single vehicle (for example, more than just the newly purchased vehicle). If only one vehicle exists in the garage, then block 415 may comprise determining that no business rules are needed to identify any loyalty generating vehicle or event. If more than one vehicle exists in the garage, then block 415 may comprise determining that business rules are needed to identify a loyalty generating vehicle, and the method 400 proceeds to block 420. If the garage does not include more than one vehicle, then the method 400 proceeds to block 496.

Block 420 includes determining whether the new vehicle and an owned, leased, or otherwise registered vehicle in the garage or household of the consumer are of the same model and purchased from the same dealer (for example, have the same or corresponding dealer codes). If the vehicles are of the same model and from the same dealer, then the method 400 proceeds to block 470. If the vehicles are not of the same model and from the same dealer, then the method 400 proceeds to block 425.

Block 425 includes determining whether the new vehicle and the owned vehicle in the garage or household of the consumer are of the same make and purchased from the same dealer. If the vehicles are of the same make and from the same dealer, then the method 400 proceeds to block 470. If the vehicles are not of the same make and from the same dealer, then the method 400 proceeds to block 430.

Block 430 includes determining whether the new vehicle and an owned vehicle in the garage or household of the consumer are of the same manufacturer and purchased from the same dealer. If the vehicles are of the same manufacturer and from the same dealer, then the method 400 proceeds to block 470. If the vehicles are not of the same manufacturer and from the same dealer, then the method 400 proceeds to block 435.

Block 435 includes determining whether the new vehicle and an owned vehicle in the garage or household of the consumer are of the same model only. If the vehicles are of the same model, then the method 400 proceeds to block 470. If the vehicles are not of the same model, then the method 400 proceeds to block 440.

Block 440 includes determining whether the new vehicle and an owned vehicle in the garage or household of the consumer are of the same make only. If the vehicles are of the same make, then the method 400 proceeds to block 470. If the vehicles are not of the same make, then the method 400 proceeds to block 445.

Block 445 includes determining whether the new vehicle and an owned vehicle in the garage or household of the consumer are of the same manufacturer only. If the vehicles are of the same manufacturer, then the method 400 proceeds to block 470. If the vehicles are not of the same manufacturer, then the method 400 proceeds to block 450.

Block 450 includes determining whether the new vehicle and an owned vehicle in the garage or household of the consumer are of the same class only. If the vehicles are of the same class, then the method 400 proceeds to block 470. If the vehicles are not of the same class, then the method 400 proceeds to block 455.

Block 455 includes determining whether the new vehicle and an owned vehicle in the garage or household of the consumer are of the same subtype only. If the vehicles are of the same subtype, then the method 400 proceeds to block 470. If the vehicles are not of the same subtype, then the method 400 proceeds to block 460.

Block 460 includes determining whether the new vehicle and an owned vehicle in the garage or household of the consumer are of the same type only. If the vehicles are of the same type, then the method 400 proceeds to block 470. If the vehicles are not of the same type, then the method 400 proceeds to block 465.

Block 465 includes determining whether the new vehicle and an owned vehicle in the garage or household of the consumer are of the same size class only. If the vehicles are of the same size class, then the method 400 proceeds to block 470. If the vehicles are not of the same size class, then the method 400 also proceeds to block 470. Where there is no match through block 465, the purchased vehicle may be determined to be distinctly different from all (for example, any one) of the owned vehicles. The method 400 will then seek to match the vehicle based on transaction type (new, used, certified used) before defaulting to the oldest vehicle in the garage based on acquisition date, provided that the oldest vehicle was acquired in the last X years, for example, 12 years, 10 years, or 25 years. The X year rule may help to avoid unnecessary pairing, such as pairing with collector cars.

Block 470 includes determining whether more than one match exists from the determinations of blocks 415-465. Block 470 may also determine if more than 1 match was made at a particular rule. If so, some additional processing may be used to create a 1:1 pair between the purchased vehicle and an owned vehicle. If more than one exists, then the method 400 proceeds to block 475. If not, the method 400 may create a pair between the purchased vehicle and the single owned vehicle selected by the rules. The method 400 then proceeds to block 475.

Block 475 includes determining if the vehicle purchase is a new vehicle as opposed to a used vehicle or a CPO vehicle. If the vehicle purchase is a new vehicle, a "new" count value is incremented and the method 400 proceeds to block 490. If the vehicle purchase is not a new vehicle, then the method 400 proceeds to block 480.

Block 480 includes determining if the vehicle purchase is a CPO vehicle as opposed to a used vehicle or a new vehicle. If the vehicle purchase is a CPO vehicle, a "CPO" count value is incremented and the method 400 proceeds to block 490. If the vehicle purchase is not a CPO vehicle, then the method 400 proceeds to block 485.

Block 485 includes determining if the vehicle purchase is a used vehicle as opposed to a new vehicle or a CPO vehicle. If the vehicle purchase is a new vehicle, a "used" count value is incremented and the method 400 proceeds to block 490.

Block 490 includes determining if the count is greater than one. Should one of the blocks return more than one vehicle, additional processing is required to pair the purchased vehicle with a single owned vehicle in the garage.

If it is greater than one, the method 400 proceeds to block 495. If it is not greater than one, then the method 400 proceeds to block 496.

Block 495 includes sorting the vehicles in the garage or the household according to owner acquisition date. The method 400 then proceeds to block 496.

At block 496, the method 400 uses the result of the business rules creates a data record, where the purchased vehicle is paired with an owned/garaged vehicle. This record may be written into the data warehouse The method 400 then proceeds to block 497, where a subsequent record is processed by the method 400.

VIII. User Interface Modules—Use Case—Vehicle Data

FIGS. 5A and 5B are embodiments of user interface modules generated as part of the method disclosed in FIG. 3. The customized set of data analytics indicating loyalty metrics and reports generated by the notification module 214 may track consumer repurchase activity, such as return to market statistics, dealer loyalty, brand loyalty, and conquest and defection metrics. For example, the report may be generated for a specific manufacturer or dealer. The generated report may include various information, such as key performance metrics 505, conquest and/or defection performance 510, loyalty trends 515, conquest and defection trends 520, model loyalty table 525, and a loyalty map 530. In some embodiments, additional information not shown in this figure may be included in the report or some of the information illustrated may not be included.

In some embodiments, the reports may be delivered monthly and track metrics on a rolling 3-month and rolling 12-month basis, for example. Rolling 3-month is an aggregation of the previous 3 months activity with rolling 12-month being representative of the previous 12 months. In some embodiments, other delivery rates or metrics may be used. In some embodiments, the report may indicate the time periods covered by the illustrated metrics.

The key performance metrics 505 may include a table highlighting key performance metrics among the dealers returning customer population. The table may include various fields and corresponding values for each of the 3-month rolling period, the 12-month rolling period, and changes for both the 3-month rolling period and the 12-month rolling period. In some embodiments, the fields illustrated in the table key performance metrics 505 include:

return to market ("RIM") is a count of all the dealers customers who returned to market and purchased a vehicle during the time period covered;

a dealer loyalty value is a subset of RTM that bought another vehicle from the same dealer;

a dealer loyalty rate is a percentage of RTM that was loyal to the dealership ("Dealer Loyal/RTM");

a brand loyal is the subset of RTM that was loyal to the manufacturer, including those who were dealer loyal;

a brand loyalty rate is the percentage of RTM that was loyal to the manufacturer ("Brand Loyal/RTM");

dealer defections is the subset of RTM that was not loyal to the dealership ("RIM—Dealer Loyal");

conquests is a number of new customer acquisitions, customers who have defected from another brand or dealership;

conquest/defection net is a number of conquests less the number of defections, where positive numbers indicate growth, whereas numbers less than one are indicative of a shrinking customer base;

a conquest/defection ratio is a number of conquests divided by the number of defections, where numbers greater than one indicate a growing customer base and numbers less than one indicate more customers left the dealership than those that were conquested;

CPO to New Units is the subset of RTM that purchased a CPO vehicle from the dealership then returned within the time period in question to buy a new vehicle from the dealership; and CPO contribution to loyalty is a number of CPO to New Units divided by the number of Dealer Loyal, indicates the percentage of dealer loyal driven from the certified pre-owned program.

The conquest and/or defection performance 510 may include brand level net gains/losses from a brand perspective. In one example, the dealership may have a conquest/defection ratio of five against Chevrolet and a net gain of 8 units from Chevrolet in the previous 12 months. The loyalty trend 515 may show a comparative view of the dealer's loyalty performance against the market, the region, the nation, or some other comparative data set. Within the illustrated display rendering, each data point is representative of the rolling Y-month loyalty rate, for example, 3 months, 6 months, or 12 months. The conquest/defection ration trend 520 may show a comparative view of their conquest/defection performance against the market, region, nation, and so forth. Within the trend, each data point may be representative of a rolling Z-month conquest/defection ratio, for example 3 months, 6 months, or 12 months.

The model loyalty table 525 may provide model specific information for many of the metrics of the key performance metrics 505. The dealer loyalty map 530 may show dealer loyalty rates within each zip code or region of the map.

In some embodiments, the methodology to calculate repurchase activity may follow a simple set of hierarchical rules to find loyalty at the dealer, make and manufacturer levels, where it exists. The method uses a "new" vehicle sales event as a trigger event for loyalty processing. The data to identify the new vehicle sales event may be provided by manufacturers or may be acquired from public or private databases. These events and data may be processed against known ownership records, based on both historical sales and registration data to identify if a loyalty event has occurred. Following a set of business rules, the new vehicle sales events are matched to the owner household and a single vehicle in the garage is paired with the new vehicle sale as a return to the market event. Evaluation of this vehicle pair determines if the loyalty event has occurred.

In the example below, a dealer Import Motors previously sold a BMW X5 to the unnamed owner in question. That owner later returned to purchase a BMW 328i from Import Motors, resulting in a loyalty event at both the Dealer and Make levels. In some embodiments, based on the source for the information used in identifying the loyalty events, details of the owner may not be provided as part of the report.

| New Vehicle Selling Dealer | New Vehicle Make-Model | Owned Vehicle Selling Dealer | Owned Vehicle Make-Model | Dealer Loyalty | Make Loyalty |
|---|---|---|---|---|---|
| Import Motors | BMW 328i | Import Motors | BMW X5 | Yes | Yes |

Dealer level loyalty rates may be calculated by dividing the number of loyalty events by the number of return to market events for the dealer in question (Import Motors in the example provided herein). Return to market events may comprise a count of the owned dealer, whereas loyalty events may comprise a count of the events where the owned and purchase dealer are equal.

| Dealer | RTM | Dealer Loyal | Equation | Dealer Loyalty Rate |
|---|---|---|---|---|
| Import Motors | 105 | 33 | 33/105 | 31.4% |

Understanding the application of the business rules based on the vehicles in the garage can be challenging. Loyalty events may not be based on vehicle trade-in or actual vehicle replacement. Loyalty events may instead be based on identifying which vehicle in the owner's garage or purchase history had the greatest or a significant impact on repurchase activity. Analyzing repurchase loyalty events as described herein may provide a study population that is large enough to apply findings at a dealer level and in a mechanism that provides fair and consistent metrics across the entire dealer network. The rules below highlight one exemplary order of applying the loyalty rules by the methodology. In one example, the goal may be to find the best match to the newly purchased vehicle.

Sample Rules

Same dealer, same model

Same dealer, same make

Same dealer, same manufacturer

Same model

Same make

Same manufacturer

Same vehicle class (Luxury, Non-Luxury)

Same vehicle sub-type (Sedan, Coupe, Wagon, and so forth)

Same vehicle type (car, truck)

Same vehicle size class (Small, Mid, Full, and so forth)

If more than one match is made at any level, preference may be given to vehicles purchased new, followed by vehicles purchased CPO, and lastly to vehicles purchased used. If more than one vehicle remains or a match was not made at the vehicle size class level, the vehicles may be sorted based on acquisition date and the oldest vehicle acquired within the last 12 years may be selected as the owned vehicle to be paired with the purchase vehicle. The examples below provide some insights into the owned vehicle selection criteria.

| New Vehicle Selling Dealer | New Vehicle Make-Model | Owned Vehicle Selling Dealer | Owned Vehicle Make-Model | Selected Vehicle | Comments |
|---|---|---|---|---|---|
| Import Motors | BMW 328i | Import Motors | BMW X5 | No | Although this vehicle is from the same selling dealer, the 3 series is the better match. |
|  |  | Import Motors | BMW 335d | Yes | This vehicle is selected because it is the same selling dealer and model (3 Series). |
|  |  | Smithport | BMW X3 | No | Because there was a match at the selling dealer level, this vehicle is not selected. BMW Smithport is not charged with a RTM event. |

Example 1

| New Vehicle Selling Dealer | New Vehicle Make-Model | Owned Vehicle Selling Dealer | Owned Vehicle Make-Model | Selected Vehicle | Comments |
|---|---|---|---|---|---|
| Import Motors | BMW 328i | Import Motors | BMW X5 | Yes | This is a match at the dealer/make level. Import Motors receives both and RTM and loyal event. |
|  |  | Crosstown BMW | BMW 335d | No | Because there was a match at the selling dealer level, this vehicle is not selected. Crosstown BMW is not charged with a RTM event. |
|  |  | BMW Smithport | BMW X3 | No | Because there was a match at the selling dealer level, this vehicle is not selected. BMW Smithport is not charged with a RTM event. |

Example 2

| New Vehicle Selling Dealer | New Vehicle Make-Model | Owned Vehicle Selling Dealer | Owned Vehicle Make-Model | Selected Vehicle | Comments |
|---|---|---|---|---|---|
| Import Motors | BMW 328i | Smith Chevrolet | Chevrolet Silverado | No | Because there is a match at the model level, Smith Chevrolet is not charged with an RTM event. |
| | | Crosstown BMW | BMW 335d | Yes | This vehicle is selected, while there was not match at the selling dealer level, there is a match at the model level (3 Series). Crosstown BMW is charged with a RTM event. This is a defection from Crosstown BMW and a conquest for Import Motors. |
| | | BMW Smithport | BMW X3 | No | Because there was a match at the model, this vehicle is not selected. BMW Smithport is not charged with a RTM event. |

Example 3

| New Vehicle Selling Dealer | New Vehicle Make-Model | Smith Ford | Owned Vehicle Make-Model | Selected Vehicle | Comments |
|---|---|---|---|---|---|
| Circle Audi | Audi A4 | Smith Ford | Chevrolet Silverado | No | The purchased Audi A4 is paired with the owned 335d Smith Chevrolet is not charged with an RTM event. |
| | | Smith Ford | BMW 335d | Yes | Both the Audi A4 and BMW 335d are luxury vehicles and match at the vehicle class level. Import Motors is charged with an RTM event. This is a defection from Import Motors and a conquest for Circle Audi. |
| | | Smith Ford | Ford Escape | No | The purchased Audi A4 is paired with the owned 335d Smith Ford is not charged with an RTM event. |

Example 4

| New Vehicle Selling Dealer | New Vehicle Make-Model | Owned Vehicle Selling Dealer | Owned Vehicle Make - Model | Selected Vehicle | Comments |
|---|---|---|---|---|---|
| Import Motors | BMW Z4 | Smith Chevrolet | Chevrolet Silverado | No | The purchased BMW Z4 is paired with the owned MX-5 Miata Smith Chevrolet is not charged with an RTM event. |
| | | South Mazda | Mazda MX-5 Miata | Yes | Both the BMW Z4 and Mazda MX-5 are the same vehicle sub-type (Roadster). South Mazda is charged with an RTM event. This is a defection from South Mazda and a conquest for Import Motors. |
| | | Smith Ford | Ford Escape | No | The purchased BMW Z4 is paired with the owned MX-5 Miata Smith Ford is not charged with an RTM event. |

Example 5

IX. Updating Data—Example Use Case—Vehicle Data

Figure 6:
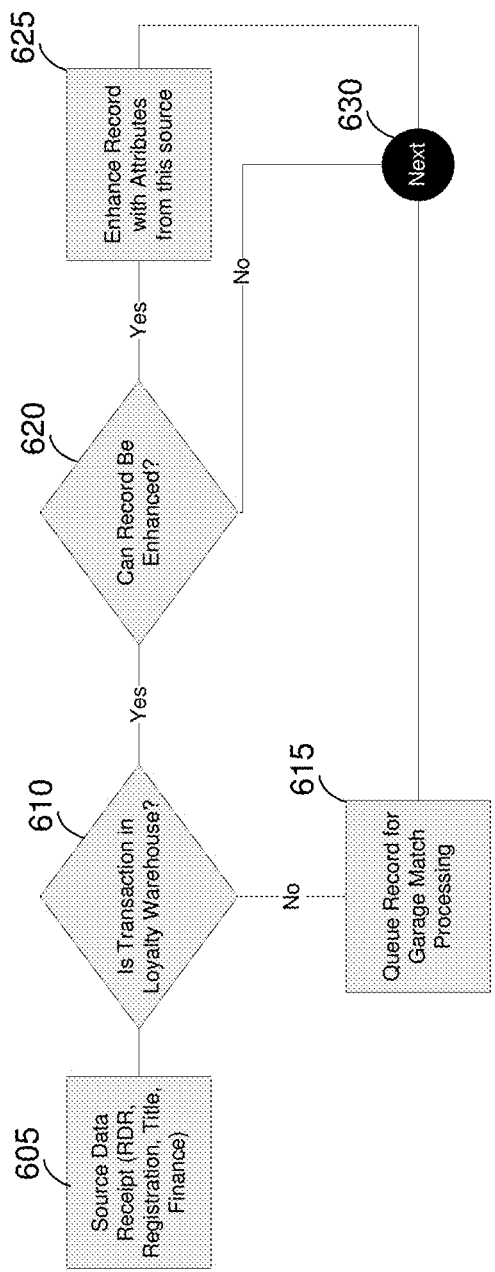
FIG. 6 is a communication flow diagram depicting communications exchanged among various components of the system of FIG. 2A for dynamically identifying event conditions.

FIG. 6 is one embodiment of a communication flow diagram for a method 600 of including and/or updating records of loyalty data. Sometimes, delays in data reception may occur. For example, a sales record received in May may correspond with a registration record in June and a title record in July (for example, all for the same transaction).

The method 600 checks to see if loyalty has already been calculated for this transaction and if so appends or links any new information from the new source. New information may include lender name or dealer code. If not, the process will run the record through the loyalty business rules engine.

In some embodiments, any of the components described herein (for example, the CPU 208, the user I/O module 204, the network I/O module 210, the notification module 214, the model generating module 213, the rule module 216, the information acquisition module 212, and/or the mass storage device 211 of the dynamic event analysis system 112 as shown in FIG. 2B) may perform this method. For example, the method 600 could be performed by the CPU 208 of the dynamic event analysis system 112. A person having ordinary skill in the art will appreciate that the method 600 may be implemented by other suitable devices and systems. Although the method 600 is described herein with reference to a particular order, in various aspects, blocks herein may be performed in a different order, or omitted, and additional blocks may be added. In some implementations, one or more blocks of the method 600 may be used for one or more steps depicted in the method 600. The method 600 may determine whether newly received data can be appended to existing records or not.

Block 605 includes receiving data from a source (for example, one of the databases 104, 106, 108, 114). After the data is received, the method 600 proceeds to block 610. At block 610, the method 600 determines whether the transaction represented in the data is already stored in the memory associated with the loyalty. If the transaction is in the memory, the method 600 proceeds to block 620. If not, the memory 600 proceeds to block 615.

Block 615 includes preparing the data for matching with a garage before the method 600 proceeds to block 630, where the method 600 proceeds to the next transaction data. At block 620, the method 600 determines whether the existing record in the memory associated with the transaction can be updated; if so, then the method 600 proceeds to block 625; if not, the method 600 proceeds to block 630. At block 625, the method 600 enhances the record in the memory with the data from the source before proceeding to block 630.

X. Processing Data—Example Use Case—Vehicle Data

Figure 7:
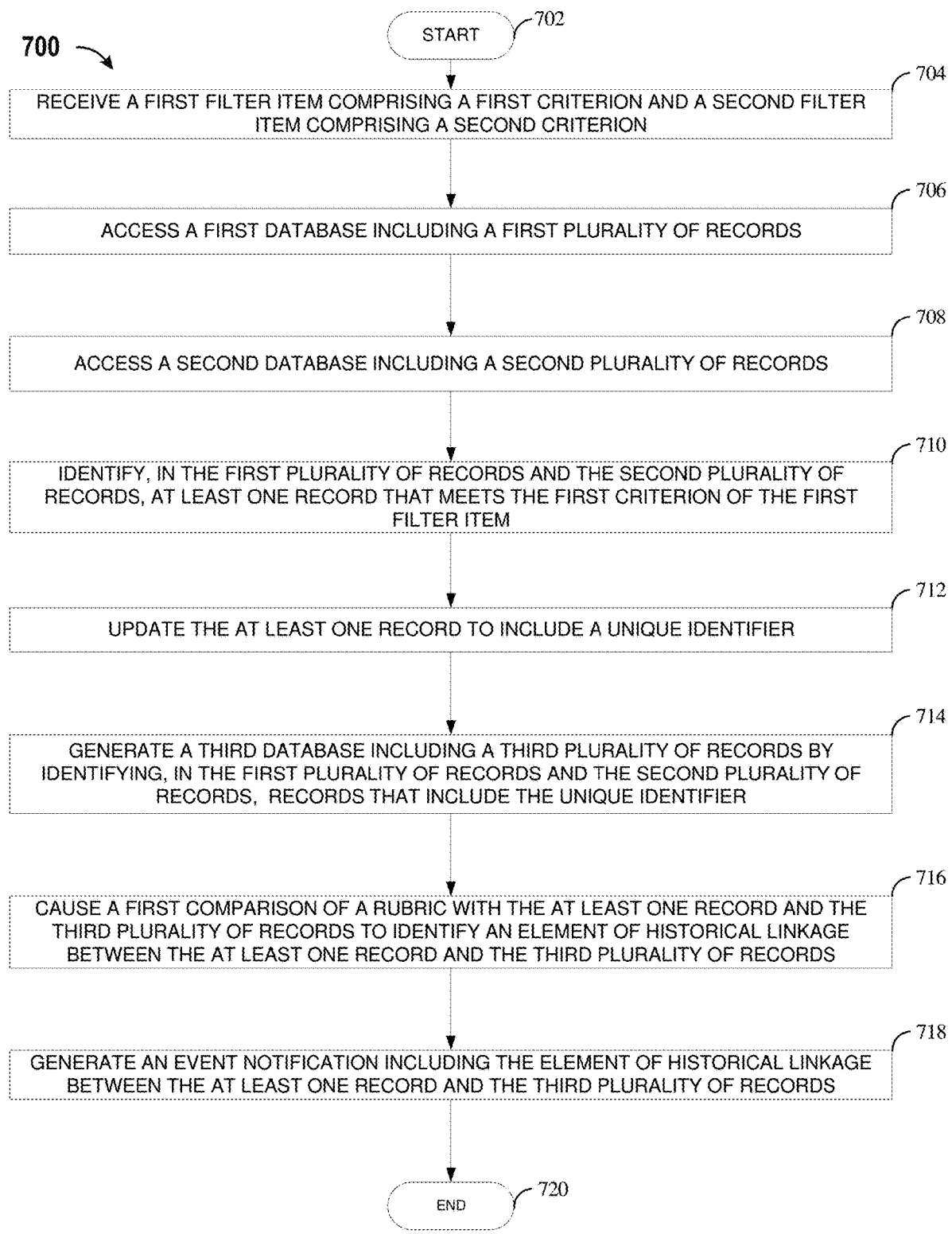
FIG. 7 is a flow chart for a method of processing data, in accordance with exemplary embodiments.

FIG. 7 is a flow chart for a method 700 of processing data, in accordance with exemplary embodiments. In some embodiments, any of the components described herein (for example, the CPU 208, the user I/O module 204, the network I/O module 210, the notification module 214, the model generating module 213, the rule module 216, the information acquisition module 212, and/or the mass storage device 211 of the dynamic event analysis system 112 as shown in FIG. 2B) may perform this method. One or more of the blocks of methods 700 may be performed simultaneously or in an order not illustrated or not performed, while other blocks not illustrated may be introduced into the method 700. The method 700 of FIG. 7 begins at block 702.

At block 704, the CPU 208 may receive a first filter item and a second filter item. The first filter item may comprise a first criterion and the second filter item may comprise a second criterion. In some embodiments, the first and second filter items may be received from a user via one or more of the network I/O module 210 and the user I/O module 204. In some embodiments, the first and second filter items may comprise one or more filter values, selections, or inputs as received from the user of the dynamic event analysis system 112.

At block 706, the CPU 208 may access a first database including a first set of records. In some embodiments, the first database may include one or more of the databases 104, 106, 108, 114. In some embodiments, the first database may be accessed by the network I/O module 210 or in conjunction with the information acquisition module 212. In some embodiments, accessing the first database comprises access the first set of records in the first database such that the first set of records may be searched or otherwise analyzed.

At block 708, the CPU 208 may access a second database including a second set of records. In some embodiments, the second database may include one or more of the databases 104, 106, 108, 114 other than the one or more of the databases 104, 106, 108, 114 of the first database. In some embodiments, the second database may be accessed by the network I/O module 210 or in conjunction with the information acquisition module 212. In some embodiments, accessing the second database comprises access the second set of records in the second database such that the second set of records may be searched or otherwise analyzed.

At block 710, the CPU 208 may identify, in the first plurality of records and the second plurality of records of the first and second databases, respectively, at least one record that meets the first criterion of the first filter item. In some embodiments, one or more of the network I/O module 210 or the information acquisition module 212 may assist in the identification of the at least one record. In some embodiments, identifying the at least one record may comprise comparing the first criterion with the records in the first plurality of records and the second plurality of records. Accordingly, the at least one record may comprise a value, selection, or input of interest to the user.

At block 712, the CPU 208 may update the at least one record to include a unique identifier. In some embodiments, one or more of the network I/O module 210 or the information acquisition module 212 may update the at least one record. The unique identifier may be a group linkage identifier or household identifier that can associate groups of records. In some embodiments, the unique identifier may comprise one or more of a geographic identifier or location, and so forth. For example, in the example use case described herein, the unique identifier may comprise a consumer address or a consumer name.

At block 714, the CPU 208 may generate a third database that includes a third set of records. The third set of records may be generated by identifying, from the first set of records and the second set of records, records that include the unique identifier. In some embodiments, one or more of the network I/O module 210 or the information acquisition module 212 may generate the third database including the third plurality of records. Accordingly, the third plurality of records may be associated with the at least one record previously identified in the first database and the second database by at least the unique identifier. For example, in the example use case described herein, the third set of records may share a consumer address (for example, the address at which vehicles associated with the third plurality of records is registered), consumer name (for example, the name of the consumer to which the vehicles associated with the third set of records is registered), or other identifying information with the at least one record.

At block 716, the CPU 208 may cause a first comparison of a rubric of historical linkage or loyalty features with the at least one record and the third set of records. In some embodiments, such a comparison may identify one or more elements of historical linkage or loyalty or association between the at least one record and the third set of records. In some embodiments, one or more of the network I/O module 210, the rule module 216, the model generating module 213, or the information acquisition module 212 may cause the first comparison. In some embodiments, the comparison of the rubric of historical linkage or loyalty features may comprise applying one or more rules or comparisons to the at least one record and the third set of records. In some embodiments, the first comparison may result in identification of additional associations (additional beyond the unique identifier) between one or more of the third set of records and the at least one record. For example, in the example use case described herein, the first comparison may identify that the at least one record and the plurality of records share a manufacturer, a model, a vehicle type, or other aspect or factor. In some embodiments, the "shared" aspect or factor may correspond to the element of loyalty.

At block 718, the CPU 208 may generate an event notification or encrypted data packets including the element of historical linkage or loyalty. In some embodiments, one or more of the network I/O module 210, the rule module 216, the model generating module 213, the notification module 214, or the information acquisition module 212 may generate the event notification or encrypted data packets. In some embodiments, the event notification or encrypted data packets may indicate the historical linkage or loyalty element that was identified based on the comparison of the rubric of historical linkage or loyalty features and the third set of records and the at least one record.

At block 720, the method 700 terminates.

XI. Computing Systems

The hardware and/or software components, as discussed herein may be included in any of the devices of the system 100 (for example, the user terminals 110, the dynamic event analysis system 112, and so forth). These various depicted components may be used to implement the systems and methods described herein. Any of the components or systems described herein may be controlled by operating system software, such as Windows XP, Windows Vista, Windows 7, Windows 8, Windows Server, UNIX, Linux, SunOS, Solaris, iOS, Android, Blackberry OS, or other similar operating systems. In Macintosh systems, the operating system may be any available operating system, such as MAC OS X. In other embodiments, the components or systems described herein may be controlled by a proprietary operating system. Conventional operating systems control and schedule computer processes for execution, perform memory management, provide file system, networking, I/O services, and provide a user interface, such as a graphical user interface ("GUI"), among other things.

Computing devices, which may comprise the software and/or hardware described above, may be an end user computing device that comprises one or more processors able to execute programmatic instructions. Examples of such computing devices are a desktop computer workstation, a smart phone such as an Apple iPhone or an Android phone, a computer laptop, a tablet PC such as an iPad, Kindle, or Android tablet, a video game console, or any other device of a similar nature. In some embodiments, the computing devices may comprise a touch screen that allows a user to communicate input to the device using their finger(s) or a stylus on a display screen.

The computing devices may also comprise one or more client program applications, such as a mobile "app" (for example, iPhone or Android app) that may be used to visualize data, and initiate the sending and receiving of messages in the computing devices. This app may be distributed (for example downloaded) over the network to the computing devices directly or from various third parties such as an Apple iTunes or Google Play repository or "app store." In some embodiments, the application may comprise a set of visual interfaces that may comprise templates to display vehicle history reporting and financing information. In some embodiments, as described above, visual user interfaces may be downloaded from another server or service. This may comprise downloading web page or other HTTP/HTTPS data from a web server and rendering it through the "app". In some embodiments, no special "app" need be downloaded and the entire interface may be transmitted from a remote Internet server to computing device, such as transmission from a web server to an iPad, and rendered within the iPad's browser.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the vehicle history reporting and financing system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In some embodiments, the system distinguishes between the initial transmission of loan application data required for user interfaces, and subsequent transmissions of user interface data so that it may transmit only portions that are necessary to update a vehicle history reporting and financing user interface. This may be done, for example, using an XMLHttpRequest (XHR) mechanism, a data push interface, Asynchronous JavaScript and XML ("Ajax"), or other communication protocols.

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process blocks may be stored, persistently or otherwise, in any type of non-transitory computer storage such as, for example, volatile or non-volatile storage.

The various features and processes described above may be used independently of one another, or may be combined in various ways. All possible combinations and sub combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or blocks. Thus, such conditional language is not generally intended to imply that features, elements and/or blocks are in any way required for one or more embodiments or that one or more embodiments necessarily include logic for deciding, with or without user input or prompting, whether these features, elements and/or blocks are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or blocks in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the vehicle history reporting and financing system 100, marketing computing device 162, and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

The I/O devices and interfaces provide a communication interface to various external devices and systems. The computing system may be electronically coupled to a network, which comprises one or more of a LAN, WAN, the Internet, or cloud computing networks, for example, via a wired, wireless, or combination of wired and wireless, communication links. The network communicates with various systems or other systems via wired or wireless communication links, as well as various data sources.

Information may be provided to the computing system 1200 over the network from one or more data sources including, for example, external sources 104, 108 or internal source information database. In addition to the sources that are illustrated in FIG. 1, the network may communicate with other data sources or other computing devices. The data sources may include one or more internal or external data sources. In some embodiments, one or more of the databases or data sources may be implemented using an open-source cross-platform document-oriented database program, such as a Mongo dB, a relational database, such as IBM DB2, Sybase, Oracle, CodeBase and Microsoft® SQL Server as well as other types of databases such as, for example, a flat file database, an entity-relationship database, and object-oriented database, and/or a record-based database.

It is recognized that the term "remote" may include systems, data, objects, databases, devices, components, or modules not stored locally, that are not accessible via the local bus. Thus, remote data may include a system that is physically stored in the same room and connected to the computing system via a network. In other situations, a remote device may also be located in a separate geographic area, such as, for example, in a different location, country, and so forth.

XII. Additional Embodiments

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or blocks. Thus, such conditional language is not generally intended to imply that features, elements and/or blocks are in any way required for one or more embodiments or that one or more embodiments necessarily include logic for deciding, with or without user input or prompting, whether these features, elements and/or blocks are included or are to be performed in any particular embodiment.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof.

It should be emphasized that many variations and modifications may be made to the above-described embodiments, the elements of which are to be understood as being among other acceptable examples. All such modifications and variations are intended to be included herein within the scope of this disclosure and protected by the following.

What is claimed is:

1. A data processing system for accessing databases and data items, the data processing system comprising:
   a vehicle database including a first plurality of purchased vehicle records;
   a garaged vehicle database including a second plurality of garaged vehicle records each associated with one of a plurality of household identifiers and indicating vehicles that were previously registered and associated with one or more addresses or one or more individuals or one or more family groups;
   a sales records database including a third plurality of dealer lineage records;
   a rubric engine including a fourth plurality of rules related to assessing historical associations among vehicles and dealers; and
   a hardware processor configured to execute computer-executable instructions in order to:
      access a title records data set from a first remote system, the title records data stored in non-standardized formats and comprising more than one million records related to vehicle titles and entities who purchase or leased vehicles;
      access a registrations records data set from a second remote system, the registrations records data set stored in non-standardized formats and comprising more than one million records related to vehicle registrations and time data associated with time periods when vehicles are indicated as owned by or leased by specific entities;
      electronically aggregate and filter the non-standardized title records data set and the non-standardized registration records data set into a standard format and generate the vehicle database by including records from the non-standardized title records data set and the non-standardized registrations data set that meet transaction criteria and excluding records from the title records data set and the registrations records data set that do not meet the transaction criteria;
      receive via a network input/output interface, an electronic request from a remote computing system for a customized loyalty metric assessment comprising a first dealer criterion associated with at least one dealer;
      automatically identify, in the first plurality of purchased vehicle records a first set of purchased vehicle records that meets the first dealer criterion;
      automatically correlate each of the first set of purchased vehicle records to household identifiers of the plurality of household identifiers;
      automatically identify, in the second plurality of garaged vehicle records, a second set of garaged vehicles associated with household identifiers;
      automatically identify, in the third plurality of dealer lineage records, one or more dealer codes associated with the first dealer criterion and one or more of the first set of purchased vehicle records;
      dynamically select a first set of rules, from the fourth plurality of rules, that are associated with the first dealer criterion;
      automatically apply the first set of rules to the first set of purchased vehicle records and the second set of garaged vehicles to assess historical linkage features among the first set of purchased vehicle records and the second set of garaged vehicle records;
      based at least on the assessment of historical linkage features, trigger the automatic generation of customized loyalty metrics in a first time period and associated with the first dealer criterion indicating one or more of:
         an indicator of return to market purchases in the first time period associated with the first dealer criterion indicating purchasers who returned to purchase a vehicle,
         an indicator of new acquisitions in the first time period associated with the first dealer criterion indicating purchasers who recently first purchased from the dealer, or
         an indicator of defections in the first time period associated with the first dealer criterion indicating purchasers who previously purchased from the dealer, but have recently purchased from a different dealer;
      automatically overlay the customized loyalty metrics onto a geographic mapping data set representing a visual representation of a set of geographic regions using associations among geographic areas in the customized loyalty metrics and geographic areas in the geographic mapping data set;
      generate a loyalty mapping with visual loyalty mapping indicators for a first set of geographic regions in the set of geographic regions;
      generate instructions that when executed automatically render a user interface display with the loyalty mapping to display the visual loyalty mapping indicators;
      automatically generate and send to the remote computing system an event notification data package including at least a portion of the customized loyalty metrics, the event notification package providing remote access to the customized loyalty metrics and the loyalty mapping by the remote computing system;
      detect an update in the customized loyalty metrics; and
      in response to such detection,
         access the updated customized loyalty metrics;
         overlay the updated customized loyalty metrics onto the geographic mapping data set;
         generate an updated loyalty mapping with revised visual loyalty mapping indicators for the first set of geographic regions using associations among geographic areas in the updated customized loyalty metrics and geographic areas in the geographic mapping data set;
         generate updated instructions that when executed automatically re-render the user interface display with the updated loyalty mapping to display the revised visual loyalty mapping indicators; and
         automatically generate and send to the remote computing system a second event notification data package including at least a portion of the updated customized loyalty metrics, the second event notification package providing remote access to the updated customized loyalty metrics and the updated loyalty mapping by the remote computing system.

2. The data processing system of claim 1, wherein the event notification data package comprises an encrypted data packet based on the customized loyalty metrics comprising instructions for rendering secure interfaces based on the customized loyalty metrics.

3. The data processing system of claim 1 further comprising:
a scoring engine;
the hardware processor configured to execute computer-executable instructions in order to:
execute the scoring engine using the assessment of historical linkage features to generate a historical linkage score file; and
cause an update to the generated event notification data package to include the historical linkage score file.

4. The data processing system of claim 1, wherein the household identifiers include geographic locations associated with the first set of purchased vehicle records.

5. The data processing system of claim 1, wherein the customized loyalty metrics include loyalty trends which reflect metrics on a predetermined rolling time period.

6. The data processing system of claim 5, wherein the pre-determined time period is based on a set number of previous months.

7. The data processing system of claim 1, wherein the automatic applying of the first set of rules to the first set of purchased vehicle records comprises applying a waterfall set of rules directed to one or more features related to: household match, garage count, vehicle model, vehicle make, vehicle manufacturer, or vehicle class.

8. A computer implemented method of accessing databases and data items comprising:
receiving, via a network input/output interface, an electronic request from a remote computing system for a customized loyalty metric assessment comprising a first dealer criterion associated with at least one dealer;
accessing a vehicle database including a first plurality of purchased vehicle records;
accessing a title records data set from a first remote system, the title records data stored in non-standardized formats and comprising more than one million records related to vehicle titles and entities who purchase or leased vehicles;
accessing a registrations records data set from a second remote system, the registrations records data set stored in non-standardized formats and comprising more than one million records related to vehicle registrations and time data associated with time periods when vehicles are indicated as owned by or leased by specific entities;
electronically aggregating and filtering the non-standardized title records data set and the non-standardized registration records data set into a standard format and generate the vehicle database by including records from the non-standardized title records data set and the non-standardized registrations data set that meet transaction criteria and excluding records from the title records data set and the registrations records data set that do not meet the transaction criteria;
accessing a garaged vehicle database including a second plurality of garaged vehicle records each associated with one of a plurality of household identifiers and indicating vehicles that were previously registered and associated with one or more addresses or one or more individuals or one or more family groups; and
accessing a sales records database including a third plurality of dealer lineage records;
accessing a rubric engine including a fourth plurality of rules related to assessing historical associations among vehicles and dealers;
automatically identifying, in the first plurality of purchased vehicle records a first set of purchased vehicle records that meets the first dealer criterion;
automatically correlating each of the first set of purchased vehicle records to household identifiers of the plurality of household identifiers;
automatically identifying, in the second plurality of garaged vehicle records, a second set of garaged vehicles associated with household identifiers;
automatically identifying, in the third plurality of dealer lineage records, one or more dealer codes associated with the first dealer criterion and one or more of the first set of purchased vehicle records;
dynamically selecting a first set of rules, from the fourth plurality of rules, that are associated with the first dealer criterion;
automatically applying the first set of rules to the first set of purchased vehicle records and the second set of garaged vehicles to access historical linkage features among the first set of purchased vehicle records and the second set of garaged vehicle records;
based at least on the assessment of historical linkage features, triggering the automatic generation of customized loyalty metrics in a first time period and associated with the first dealer criterion indicating one or more of:
an indicator of return to market purchases in the first time period associated with the first dealer criterion indicating purchasers who returned to purchase a vehicle,
an indicator of new acquisitions in the first time period associated with the first dealer criterion indicating purchasers who recently first purchased from the dealer, or
an indicator of defections in the first time period associated with the first dealer criterion indicating purchasers who previously purchased from the dealer, but have recently purchased from a different dealer;
automatically overlaying the customized loyalty metrics onto a geographic mapping data set representing a visual representation of a set of geographic regions using associations among geographic areas in the customized loyalty metrics and geographic areas in the geographic mapping data set;
generating a loyalty mapping with visual loyalty mapping indicators for a first set of geographic regions in the set of geographic regions;
generating instructions that when executed automatically render a user interface display with the loyalty mapping to display the visual loyalty mapping indicators;
automatically generating and sending to the remote computing system an event notification data package including at least a portion of the customized loyalty metrics, the event notification package far providing remote access to the customized loyalty metrics and the loyalty mapping by the remote computing system;
detecting an update in the customized loyalty metrics; and
in response to such detection,
accessing the updated customized loyalty metrics;
overlaying the updated customized loyalty metrics onto the geographic mapping data set;

generating an updated loyalty mapping with revised visual loyalty mapping indicators for the first set of geographic regions using associations among geographic areas in the updated customized loyalty metrics and geographic areas in the geographic mapping data set;

generating updated instructions that when executed automatically re-render the user interface display with the updated loyalty mapping to display the revised visual loyalty mapping indicators; and automatically generating and sending to the remote computing system a second event notification data package including at least a portion of the updated customized loyalty metrics, the second event notification package providing remote access to the updated customized loyalty metrics and the updated loyalty mapping by the remote computing system.

9. The computer implemented method of claim 8, wherein generating an event notification data package comprises generating an encrypted data packet based on the customized loyalty metrics for rendering secure interfaces based on the customized loyalty metrics.

10. The computer implemented method of claim 8 further comprising:
generating a historical linkage score file based on the assessment of historical linkage features; and
causing an update to the generated event notification data package to include the historical linkage score file.

11. The computer implemented method of claim 8, wherein the household identifiers include geographic locations associated with the first set of purchased vehicle records.

12. The computer implemented method of claim 8, wherein the customized loyalty metrics include loyalty trends which reflect metrics on a predetermined rolling time period.

13. The computer implemented method of claim 12, wherein the pre-determined time period is based on a set number of previous months.

14. The computer implemented method of claim 8, wherein the automatic applying of the first set of rules to the first set of purchased vehicle records comprises applying a waterfall set of rules directed to one or more features related to: household match, garage count, vehicle model, vehicle make, vehicle manufacturer, or vehicle class.

15. Non-transitory, computer-readable storage media storing computer-executable instructions that, when executed by a computer system, configure the computer system to perform operations comprising:
receiving, via a network input/output interface, an electronic request from a remote computing system for a customized loyalty metric assessment comprising a first dealer criterion associated with at least one dealer;
accessing a vehicle database including a first plurality of purchased vehicle records;
accessing a title records data set from a first remote system, the title records data stored in non-standardized formats and comprising more than one million records related to vehicle titles and entities who purchase or leased vehicles;
accessing a registrations records data set from a second remote system, the registrations records data set stored in non-standardized formats and comprising more than one million records related to vehicle registrations and time data associated with time periods when vehicles are indicated as owned by or leased by specific entities;
electronically aggregating and filtering the non-standardized title records data set and the non-standardized registration records data set into a standard format and generate the vehicle database by including records from the non-standardized title records data set and the non-standardized registrations data set that meet transaction criteria and excluding records from the title records data set and the registrations records data set that do not meet the transaction criteria;
accessing a garaged vehicle database including a second plurality of garaged vehicle records each associated with one of a plurality of household identifiers and indicating vehicles that were previously registered and associated with one or more addresses or one or more individuals or one or more family groups; and
accessing a sales records database including a third plurality of dealer lineage records;
accessing a rubric engine including a fourth plurality of rules related to assessing historical associations among vehicles and dealers;
automatically identifying, in the first plurality of purchased vehicle records a first set of purchased vehicle records that meets the first dealer criterion;
automatically correlating each of the first set of purchased vehicle records to household identifiers of the plurality of household identifiers;
automatically identifying, in the second plurality of garaged vehicle records, a second set of garaged vehicles associated with household identifiers;
automatically identifying, in the third plurality of dealer lineage records, one or more dealer codes associated with the first dealer criterion and one or more of the first set of purchased vehicle records;
dynamically selecting a first set of rules, from the fourth plurality of rules, that are associated with the first dealer criterion;
automatically applying the first set of rules to the first set of purchased vehicle records and the second set of garaged vehicles to access historical linkage features among the first set of purchased vehicle records and the second set of garaged vehicle records;
based at least on the assessment of historical linkage features, triggering the automatic generation of customized loyalty metrics in a first time period and associated with the first dealer criterion indicating one or more of:
an indicator of return to market purchases in the first time period associated with the first dealer criterion indicating purchasers who returned to purchase a vehicle,
an indicator of new acquisitions in the first time period associated with the first dealer criterion indicating purchasers who recently first purchased from the dealer, or
an indicator of defections in the first time period associated with the first dealer criterion indicating purchasers who previously purchased from the dealer, but have recently purchased from a different dealer;
automatically overlaying the customized loyalty metrics onto a geographic mapping data set representing a visual representation of a set of geographic regions using associations among geographic areas in the customized loyalty metrics and geographic areas in the geographic mapping data set;

generating a loyalty mapping with visual loyalty mapping indicators for a first set of geographic regions in the set of geographic regions;
generating instructions that when executed automatically render a user interface display with the loyalty mapping to display the visual loyalty mapping indicators;
automatically generating and sending to the remote computing system an event notification data package including at least a portion of the customized loyalty metrics, the event notification package providing remote access to the customized loyalty metrics and the loyalty mapping by the remote computing system;
detecting an update in the customized loyalty metrics; and
in response to such detection,
  accessing the updated customized loyalty metrics;
  overlaying the updated customized loyalty metrics onto the geographic mapping data set;
  generating an updated loyalty mapping with revised visual loyalty mapping indicators for the first set of geographic regions using associations among geographic areas in the updated customized loyalty metrics and geographic areas in the geographic mapping data set;
  generating updated instructions that when executed automatically re-render the user interface display with the updated loyalty mapping to display the revised visual loyalty mapping indicators; and
  automatically generating and send to the remote computing system a second event notification data package including at least a portion of the updated customized loyalty metrics, the second event notification package providing remote access to the updated customized loyalty metrics and the updated loyalty mapping by the remote computing system.

16. The non-transitory, computer-readable storage media of claim 15, wherein generating an event notification data package comprises generating an encrypted data packet based on the customized loyalty metrics for rendering interfaces based on the customized loyalty metrics.

17. The non-transitory, computer-readable storage media of claim 15, further comprising:
  generating a historical linkage score file based on the assessment of historical linkage features; and
  causing an update to the generated event notification data package to include the historical linkage score file.

18. The non-transitory, computer-readable storage media of claim 15, wherein the household identifiers include geographic locations associated with the first set of purchased vehicle records.

19. The non-transitory, computer-readable storage media of claim 15, wherein the customized loyalty metrics include loyalty trends which reflect metrics on a predetermined rolling time period.

20. The non-transitory, computer-readable storage media of claim 19, wherein the pre-determined time period is based on a set number of previous months.

* * * * *